US011078392B2

(12) United States Patent
Schultz et al.

(10) Patent No.: US 11,078,392 B2
(45) Date of Patent: Aug. 3, 2021

(54) LOWER GWP REFRIGERANT COMPOSITIONS

(71) Applicant: TRANE INTERNATIONAL INC., Davidson, NC (US)

(72) Inventors: Kenneth J. Schultz, Onalaska, WI (US); Stephen A. Kujak, Brownsville, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 15/858,896

(22) Filed: Dec. 29, 2017

(65) Prior Publication Data

US 2019/0203091 A1 Jul. 4, 2019

(51) Int. Cl.
*C09K 5/04* (2006.01)
*F25B 45/00* (2006.01)

(52) U.S. Cl.
CPC .............. *C09K 5/044* (2013.01); *C09K 5/045* (2013.01); *F25B 45/00* (2013.01);
(Continued)

(58) Field of Classification Search
CPC .......... C09K 2205/32; C09K 2205/126; C09K 2205/40; C09K 5/04; C09K 5/045; C08J 9/14; C08J 2203/142; C11D 7/50
See application file for complete search history.

(56) References Cited

U.S. PATENT DOCUMENTS 5,444,102 A 8/1995 Nimitz et al.
5,562,861 A 10/1996 Nimitz et al.
(Continued)

FOREIGN PATENT DOCUMENTS

CN 1189525 A 8/1998
CN 1431270 A 7/2003
(Continued)

OTHER PUBLICATIONS

McCullough et al., "High Performance, Low Environmental Impact Refrigerants", Available online at: https://ntrs.nasa.gov/archive/nasa/casi.ntrs.nasa.gov/20010067278.pdf, at least as early as Dec. 7, 2017 (10 pages).
(Continued)

*Primary Examiner* — Jianying C Atkisson
*Assistant Examiner* — Meraj A Shaikh
(74) *Attorney, Agent, or Firm* — Hamre, Schumann, Mueller & Larson, P.C.

(57) ABSTRACT

A non-flammable refrigerant composition for a HVACR system that includes R134a refrigerant, a hydrofluorocarbon refrigerant that has a global warming potential (GWP) of less than 150 or a hydrofluoroolefin refrigerant, and $CF_3I$. A method of making a refrigerant composition for a HVACR system that includes selecting an amount of a first refrigerant that is a hydrofluorocarbon refrigerant or a hydrofluoroolefin refrigerant, selecting an amount of $CF_3I$, and selecting an amount of R134a refrigerant. A method of retrofitting a refrigerant composition in an HVACR system that includes adding one or more compounds to the refrigerant composition. The retrofitted composition including R134a refrigerant, a hydrofluorocarbon refrigerant having a GWP of less than 150, and $CF_3I$, or R134a refrigerant, a hydrofluoroolefin refrigerant, and $CF_3I$.

17 Claims, 25 Drawing Sheets

(52) U.S. Cl.
CPC .. *C09K 2205/122* (2013.01); *C09K 2205/126* (2013.01); *C09K 2205/22* (2013.01); *C09K 2205/40* (2013.01); *F25B 2400/121* (2013.01)

(56) References Cited

U.S. PATENT DOCUMENTS

| | | | |
|---|---|---|---|
| 5,605,647 | A | 2/1997 | Nimitz et al. |
| 5,611,210 | A | 3/1997 | Nimitz et al. |
| 5,685,915 | A | 11/1997 | Nimitz et al. |
| 6,270,689 | B1 | 8/2001 | Nimitz |
| 6,969,701 | B2 | 11/2005 | Singh et al. |
| 7,074,751 | B2 | 7/2006 | Singh et al. |
| 7,341,984 | B2 | 3/2008 | Wilson et al. |
| 7,413,674 | B2 | 8/2008 | Singh et al. |
| 7,465,698 | B2 | 12/2008 | Wilson et al. |
| 2006/0243944 | A1 | 11/2006 | Minor et al. |
| 2015/0083957 | A1* | 3/2015 | Minor .................. A62D 1/0057 252/8 |
| 2015/0135765 | A1 | 5/2015 | Yana Motta et al. |
| 2018/0155594 | A1* | 6/2018 | Rached .................. C09K 5/045 |

FOREIGN PATENT DOCUMENTS

| | | |
|---|---|---|
| CN | 101124288 A | 2/2008 |
| CN | 101415793 A | 4/2009 |
| CN | 101827912 A | 9/2010 |
| CN | 102753644 A | 10/2012 |
| CN | 102925108 A | 2/2013 |
| WO | 2007148046 | 12/2007 |
| WO | 2011/101620 A2 | 8/2011 |

OTHER PUBLICATIONS

Extended European Search Report; European Patent Application No. 18213868.5; dated May 20, 2019 (6 pages).
Office Action, Chinese Patent Application No. 201811626582.9, dated May 7, 2021, with English translation (28 pages).

* cited by examiner

LOWER GWP REFRIGERANT COMPOSITIONS

FIELD

The disclosure herein relates to refrigerant compositions, which can be used in, for example, refrigeration, air conditioning, and/or heat pump systems, which, for example, can be incorporated into a heating, ventilation, air conditioning, and refrigeration (HVACR) system or unit.

BACKGROUND

Concern about environmental impact (e.g., ozone depletion) and the approval of the Montreal Protocol have resulted in a movement to replace ozone depleting refrigerants such as chlorofluorocarbons (CFCs) and hydrochlorofluorocarbons (HCFCs). Refrigerants, such as hydrofluorocarbons (HFCs) refrigerants and hydrofluoroolefins (HFOs) refrigerants have been utilized as replacements for previous refrigerants containing CFCs and HFCs. However, there has been recent movement (e.g., the Kigali Amendment to the Montreal Protocol, the Paris Agreement, United States' Significant New Alternatives Policy ("SNAP")) to phase out refrigerants that have a high global warming potential (GWP) such as some HFCs.

SUMMARY

Refrigerant compositions that are non-flammable and have an increased capacity and methods of making such compositions are described. Refrigerant compositions that perform similar to R134a are described. Refrigerant compositions, methods of making refrigerant compositions, and methods of retrofitting refrigerant compositions for servicing, controlling flammability, decreasing GWP, improving performance, and/or improving safety of an HVACR system are described.

In an embodiment, a refrigerant composition is non-flammable and includes a first refrigerant, a second refrigerant, and a third refrigerant. In an embodiment, the first refrigerant is R152a refrigerant, R1234yf refrigerant, or R1234ze(E) refrigerant. In an embodiment, the second refrigerant is R134a refrigerant. In an embodiment, the third refrigerant is $CF_3I$. In an embodiment, the refrigerant composition has a GWP of less than 600.

In an embodiment, the amounts of the first refrigerant, second refrigerant, and third refrigerant are selected so that the GWP of the refrigerant composition is less than 150.

In an embodiment, the refrigerant composition has a temperature glide that is at or about or less than 1.0° C.

In an embodiment, the refrigerant composition has an occupational exposure limit (OEL) of 300 parts per million (ppm) or greater. In an embodiment, the refrigerant composition has an OEL of 400 ppm or greater.

In an embodiment, a capacity of the refrigerant composition is at or about or within 10% of a capacity of R134a refrigerant.

In an embodiment, a method of making the refrigerant composition includes mixing an amount of a first refrigerant, an amount of a second refrigerant, and an amount of a third refrigerant. The first refrigerant being R134a refrigerant, the second refrigerant being $CF_3I$, and the third refrigerant being either R152a refrigerant, R1234yf refrigerant, or R1234ze(E) refrigerant. The refrigerant composition is nonflammable. The amounts of the first refrigerant, second refrigerant, and third refrigerant are selected so that the GWP of the refrigerant composition is less than 600.

In an embodiment, the amounts of the first refrigerant, second refrigerant, and third refrigerant are selected so that the GWP of the refrigerant composition is less than 150.

In an embodiment, the refrigerant composition has a temperature glide that is at or about or less than 1.0° C.

In an embodiment, the refrigerant composition has an occupational exposure limit (OEL) of 300 parts per million (ppm) or greater. In an embodiment, the refrigerant composition has an OEL of 400 ppm or greater.

In an embodiment, a capacity of the refrigerant composition is at or about or within 10% of a capacity of R134a refrigerant.

In an embodiment, a method of retrofitting a refrigerant composition in an HVACR system results in a retrofitted refrigerant composition that is the refrigerant composition including the first refrigerant, the second refrigerant, and the third refrigerant. In an embodiment, the method includes adding the second refrigerant and the third refrigerant to the first refrigerant. In an embodiment, the method includes adding the first refrigerant to the second and third refrigerants. The first refrigerant is R134a refrigerant, the second refrigerant is $CF_3I$, and the third refrigerant is either R152a refrigerant, R1234yf refrigerant, or R1234ze(E) refrigerant. The retrofitted refrigerant composition is nonflammable. The amounts of the first refrigerant, second refrigerant, and the third refrigerant are such that the resulting retrofitted refrigerant composition has a GWP of less than 600.

In an embodiment, the amounts of the first refrigerant, second refrigerant, and third refrigerant are selected so that the GWP of the refrigerant composition is less than 150.

In an embodiment, the refrigerant composition has a temperature glide that is at or about or less than 1.0° C.

In an embodiment, the refrigerant composition has an occupational exposure limit (OEL) of 300 parts per million (ppm) or greater. In an embodiment, the refrigerant composition has an OEL of 400 ppm or greater.

In an embodiment, a capacity of the refrigerant composition is at or about or within 10% of a capacity of R134a refrigerant.

DESCRIPTION OF THE DRAWINGS

Both described and other features, aspects, and advantages of refrigerant composition, methods of making, and methods of retrofitting a refrigerant composition in an HVACR will be better understood with reference to the following drawings.

DETAILED DESCRIPTION

Figure 1:
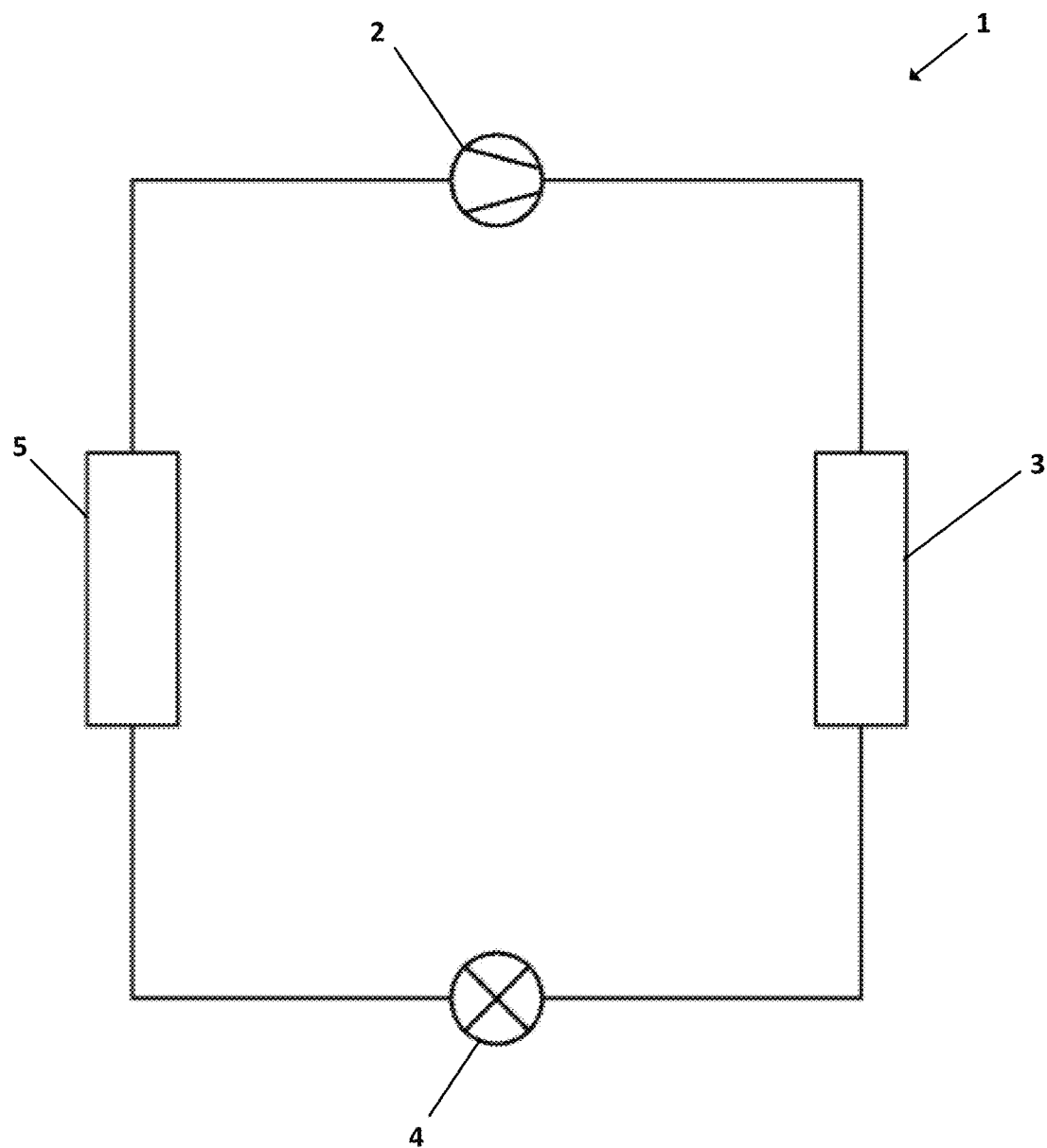
FIG. 1 illustrates a heat transfer circuit of a HVACR system in an embodiment.

HFOs (e.g., R1234yf, R1234ze(E)) and low GWP HFCs (e.g., R152a) are proposed as being alternatives to R134a, which has a GWP of 1300. GWP described herein is based on the values reported in the Fifth Assessment Report of the Intergovernmental Panel on Climate Change ("AR5"). In particular, HFOs with a GWP of less than 1 may be of interest. A HFC having a GWP of less than 150 may be considered a low GWP HFC in an embodiment.

R1234yf has a GWP of less than 1, similar thermodynamic properties to R134a, and an OEL of 500 ppm, but is flammable (classified as A2L under ASHRAE Standard 34) and has a lower capacity (approximately 6% less) and lower thermodynamic efficiency (approximately 4% less) relative to R134a. R1234ze(E) has a GWP of less than 1 an OEL of 800 ppm, but is flammable (classified as A2L under ASHRAE Standard 34) and has a significantly lower capacity relative to R134a (approximately 25%). R152a has similar thermodynamic properties to R134a, a GWP of 138, an OEL of 1000 ppm, but is flammable (classified as A2 under ASHRAE Standard 34).

CF$_3$I is a fire suppressant with a low GWP (approximately 0.4 in AR5) and thermodynamic properties that are similar to R1234ze(E) regarding operating pressures and capacity. R1234yf, R1234ze(E), or R152a may be mixed with CF$_3$I to form refrigerant compositions that are non-flammable. However, such refrigerant compositions have lower capacity due to CF$_3$I's significantly lower capacity relative to R134a (approximately 25% less). Further, CF$_3$I currently has a low OEL of 165 ppm. However, further testing of CF$_3$I may result in its OEL being raised.

Embodiments disclosed are directed to refrigerant compositions, and methods of retrofitting a refrigerant composition, and methods of making a refrigerant composition. In some embodiments, the refrigerant compositions or retrofitted refrigerant compositions are non-flammable and have a GWP of less than 600. In some embodiments, the refrigerant compositions or retrofitted compositions are non-flammable have a GWP of less than 600 and an OEL of 300 ppm or greater. In some embodiments, the refrigerant compositions or retrofitted compositions are non-flammable have a GWP of less than 600 and an OEL of 400 ppm or greater. A determination of flammability is based on ASHRAE Standard 35. Compositions described as non-flammable have a flammability that would result in their classification as a class 1 refrigerant as described by ASHRAE Standard 35.

In an embodiment, a refrigerant composition with a specific set of performance properties is desired. The refrigerant composition may be utilized in an HVACR designed for R134a. In such embodiments, it would be desired for the refrigerant composition or retrofitted composition to perform similar to R134a so that the HVACR system does not have to be modified. Performance of a refrigerant may be based on one or more properties of the refrigerant composition. For example, properties that affect performance are capacity, temperature glide, coefficient of performance, a compressor discharge temperature, mass flow rate, and a density of the refrigerant when in the fluid phase. In some embodiments, a composition with a capacity that is at or about or less than a 10% difference from the capacity of R134a is desired. For example, this range includes compositions having a capacity that from 90% to 110% of the capacity of R134a refrigerant. A HVACR system may be designed for utilizing R134a refrigerant. If the HVACR system is modified to utilize a working fluid that has a capacity that is greater than 110% or less than 90%, it may result in, for example, pressures exceeding design limits, requiring larger amounts of process fluid, and/or larger temperature differences that decrease the efficiency of the HVACR system. In some embodiments, a working fluid with a capacity that is from 95% to 105% of the capacity of R134a is desired. A working fluid with a capacity that has a capacity that is at or about or less than 5% different from R134a result in, for example, a minimal impact on the efficiency of the HVACR system designed for R134a. The performance properties may be relative to the performance properties of R134a. In some embodiments, one or more properties of a refrigerant composition may be simulated and/or estimated by an Excel-based thermodynamic tool such as NIST's REFPROP program.

Described refrigerant compositions include a low GWP HFC or HFO, CF$_3$I, and R134a. In an embodiment, a low GWP HFC may be R152a refrigerant. In an embodiment, an HFO may be R1234yf or R1234ze(E). An HFO, such as R1234ze(E), may exist as different isomers or stereoisomers. The embodiments disclosed herein include all single isomers, single stereoisomers, or any combination or mixture thereof unless noted otherwise. For example, R1234ze(E) includes only the E (trans) isomer of R1234ze and does not include the Z (cis) isomer.

An HVACR system can be used to cool or heat one or more conditioned spaces. A HVACR system may utilize a refrigerant in a circuit to cool a process fluid (e.g., air, water). For example, an HVACR system in some instances will cool an area by performing work on a refrigerant that is in a heat exchange relationship with air. The cooled air may then be ventilated to an area to cool the area.

FIG. 1 is a schematic diagram of a heat transfer circuit 1 of a HVACR system, according to an embodiment. The heat transfer circuit 1 includes a compressor 2, a condenser 3, an expansion device 4, and an evaporator 5. In an embodiment, the heat transfer circuit 1 can be modified to include additional components. For example, in an embodiment, the heat transfer circuit 1 can include an economizer heat exchanger, one or more flow control devices, a receiver tank, a dryer, a suction-liquid heat exchanger, or the like.

The components of the heat transfer circuit 1 are fluidly connected. The heat transfer circuit 1 can be configured as a cooling system (e.g., a fluid chiller of an HVACR, an air conditioning system, and the like) that can be operated in a cooling mode, and/or the heat transfer circuit 1 can be configured to operate as a heat pump system that can run in a cooling mode and a heating mode.

The heat transfer circuit 1 as described applies known principles of gas compression and cooling. The heat transfer circuit can be configured to heat or cool a process fluid (e.g., water, air). In an embodiment, the heat transfer circuit 1 may represent a chiller that cools a process fluid such as water or the like. In an embodiment, the heat transfer circuit 1 may represent an air conditioner and/or heat pump that includes a process fluid such as air or the like.

During the operation of the refrigerant circuit 1, a working fluid (e.g., refrigerant, refrigerant mixture) flows into the compressor 2 from the evaporator 5 at a relatively lower pressure in a gaseous state. The compressor 2 compresses the gas into a high pressure state, which also heats the gas. After being compressed, the relatively higher pressure and higher temperature gas flows from the compressor 2 to the condenser 3. In addition to the refrigerant flowing through the condenser 3, an external fluid (e.g., external air, external water, chiller water, and the like) also flows through the condenser 3. The external fluid absorbs the heat from the working fluid as it flows through the condenser 3. The working fluid condenses to liquid and then flows into the expansion device 4. The expansion device 4 reduces the pressure of the working fluid. The reduced pressure allows the working fluid to expand and be converted to a mixed vapor and liquid state. The relatively lower temperature, vapor/liquid working fluid then flows into the evaporator 5. A process fluid (e.g., air, water, and the like) also flows through the evaporator 5. In accordance with known principles, the working fluid absorbs heat from the process fluid as it flows through the evaporator 5. As the working fluid absorbs heat, the working fluid evaporates to vapor. The working fluid then returns to the compressor 2. The above-described process continues while the heat transfer circuit 1 is operated, for example, in a cooling mode.

The refrigerant compositions and methods described herein may be used in the heat transfer circuit 1 of the HVACR system. For example, methods of retrofitting a refrigerant composition may be applied to the heat circuit 1 of FIG. 1. Further, refrigerant compositions described herein may be used as a working fluid in the heat circuit of FIG. 1.

Figure 2:
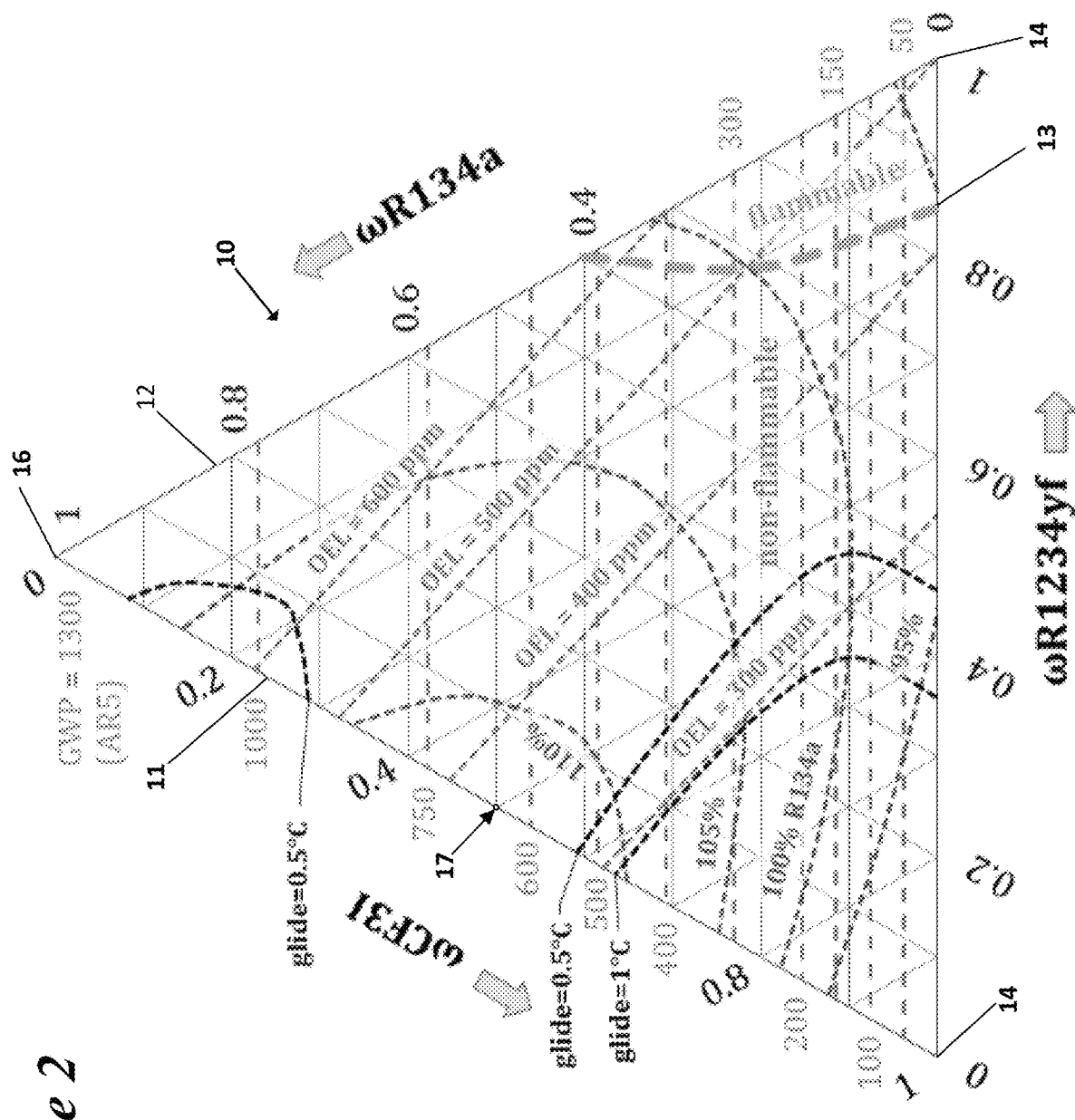
FIG. 2 illustrates a matrix of compositions of R1234yf, R134a, and $CF_3I$ showing plots of GWP, flammability, temperature glide, capacity (relative to R134a), and OEL.

FIG. 2 illustrates a matrix 10 that was developed to show plots of GWP, flammability, temperature glide, capacity (relative to R134a), and OEL as a function of the concentration of R1234yf, R134a, and $CF_3I$. Each side 11, 12, 13 of the triangle corresponds to weight percentages of R1234yf, R134a, or $CF_3I$. Each vertex 14, 15, 16 corresponds to a composition of 100 wt % R1234yf, R134a, and $CF_3I$, respectively. Properties (e.g., GWP, flammability, capacity (relative to R134a), OEL) of a refrigerant composition with a weight percent of R1234yf, $CF_3I$, and R134a can be estimated using the matrix 10.

Properties of the compositions for the matrix 10 were estimated using a thermodynamic model. Various properties are described as relative to R134a. R134a and refrigerant compositions were compared based on their properties while used in the simple vapor compression refrigeration cycle. The simple vapor compression refrigeration cycle was operated based under the following conditions:

Tsat,evap=40° F. with no suction superheat (saturated vapor)

Tsat,cond=115° F. with 15° Fd exit liquid subcooling

Compressor isentropic efficiency=70%

The properties of refrigerant R134a, when operated in this simple vapor compression refrigeration cycle, are shown below in Table 1.

TABLE 1

| Properties of R134a | |
|---|---|
| Capacity | 0.334* |
| Coefficient of Performance | 4.00 |
| Compressor Discharge Temperature | 140° F. |
| Mass Flow Rate | $188.3 \frac{lb}{hr \cdot ton}$ |
| Evaporator/Compressor Suction Pressure | 49.7 psia |
| Condenser/Compressor Discharge Pressure | 173.1 psia |

*Tons per CFM of compressor displacement (assumed to be fixed)

In FIG. 2, the boundary between flammable and non-flammable compositions is shown in the lower right corner of matrix 10 by a large dashed line. Flammable compositions are on the right side of the boundary and non-flammable compositions are on the left side of the boundary. The boundary is based on the known flammability characteristics of R1234yf, R134a, $CF_3I$, R513A, and the flame suppressant properties of $CF_3I$. R513A is a mixture of 56 wt % R1234yf and 44 wt % R134a. OEL and GWP are based on the GWP and OEL of the individual components. The flammability boundary is estimated based on known characteristics of the individual components and various binary mixtures of the components. Accordingly, the amount of each refrigerant in a composition along the flammability boundary may, for example, vary by about 5 percent in an embodiment. It should be appreciated the compositions and ranges shown and/or described may be updated based on further testing to confirm the location of the flammability boundary.

The OEL of a composition was determined based on the methodology used in ASHRAE Standard 34 for determining OEL of mixtures, which is based on the OEL of the individual refrigerants in the composition. In particular, ASHRAE calculates the OEL of a composition ($OEL_{comp}$) based on the formula:

$$\frac{1}{OEL_{comp}} = \sum_{i=1}^{n} \frac{M_n}{OEL_n}$$

Wherein n is equal to the number of refrigerants in the composition, $OEL_n$ is the OEL of refrigerant n, and $M_n$ is the mole fraction of refrigerant n of the total composition. Thus, the OEL of a composition ($OEL_{comp}$) including three refrigerants would be calculated as follows:

$$\frac{1}{OEL_{Comp}} = \frac{M_1}{OEL_1} + \frac{M_2}{OEL_2} + \frac{M_3}{OEL_3}$$

$M_1$, $M_2$, and $M_3$ are the mole fractions of the first refrigerant, second refrigerant, and third refrigerant, respectively, in the composition. $OEL_1$, $OEL_2$, and $OEL_3$, are the OELs of the first refrigerant, second refrigerant, and third refrigerant, respectively. Accordingly, it should be appreciated the lines for OELs in FIGS. 2-5 may be revised based on any changes to the OELs of the individual refrigerants.

Figure 3:
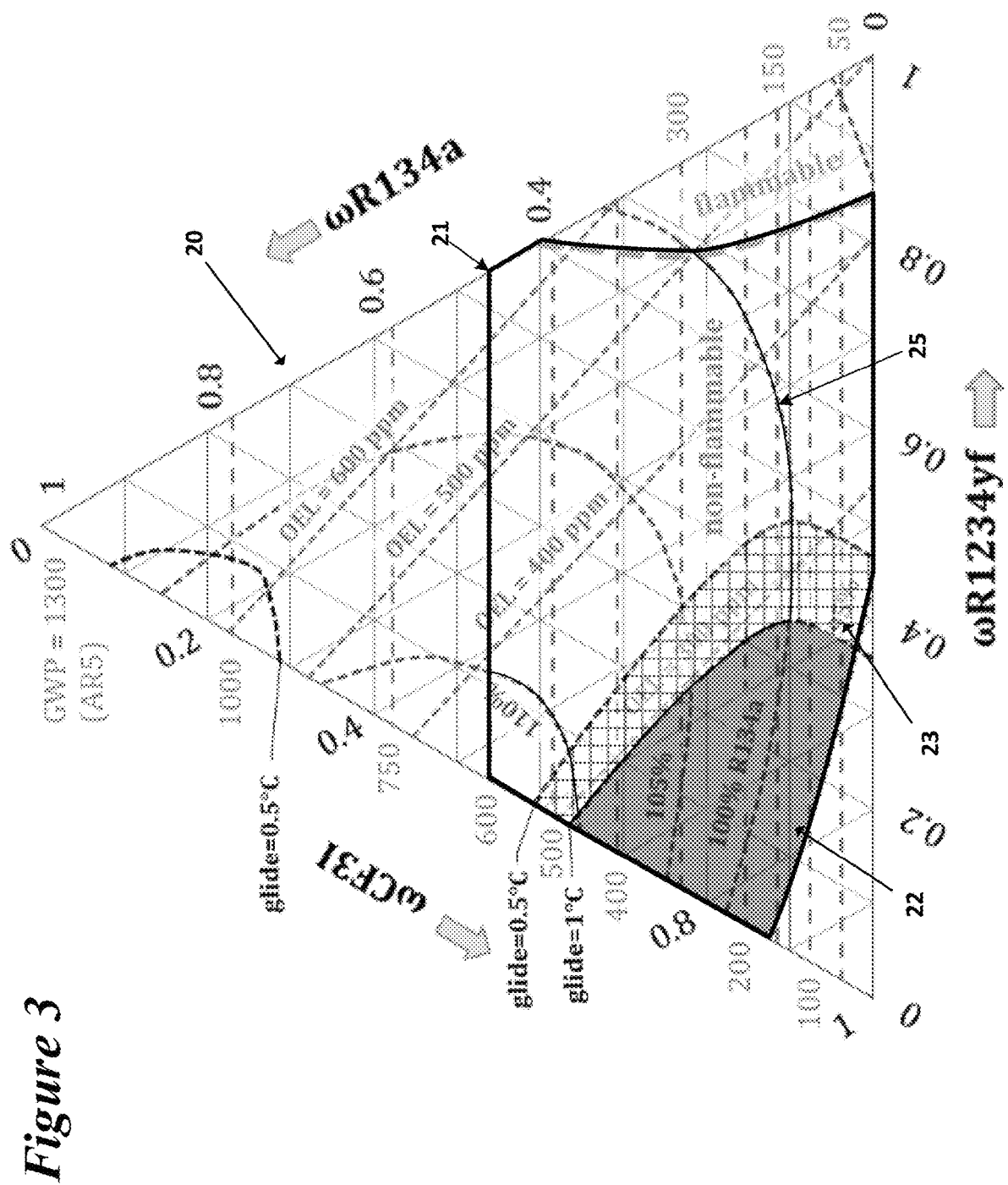
FIGS. 3-5 each illustrate a matrix based on the matrix of FIG. 2 that can be used to select a refrigerant composition with a desired set of properties in an embodiment.
Figure 4:
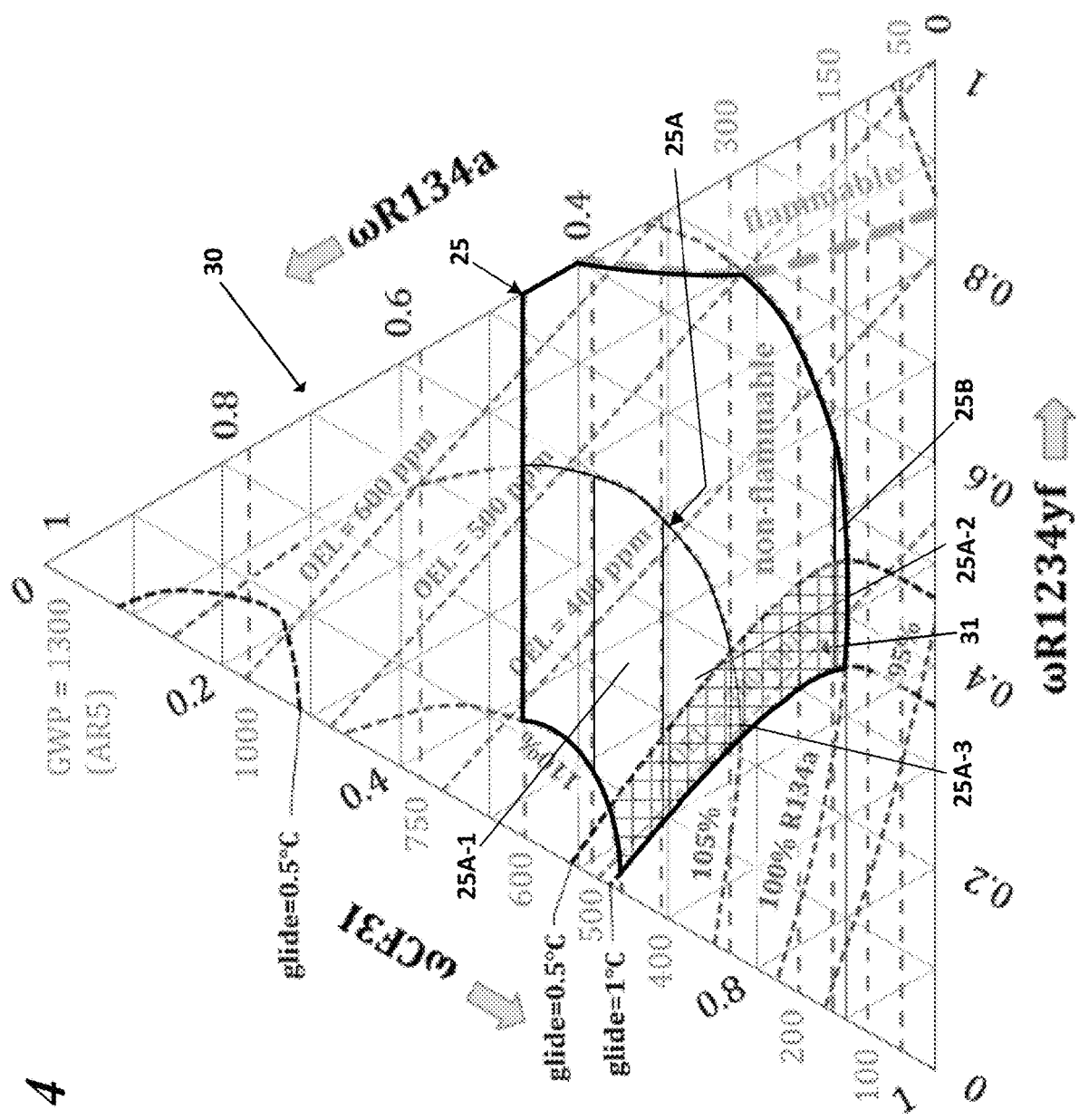
Figure 5:
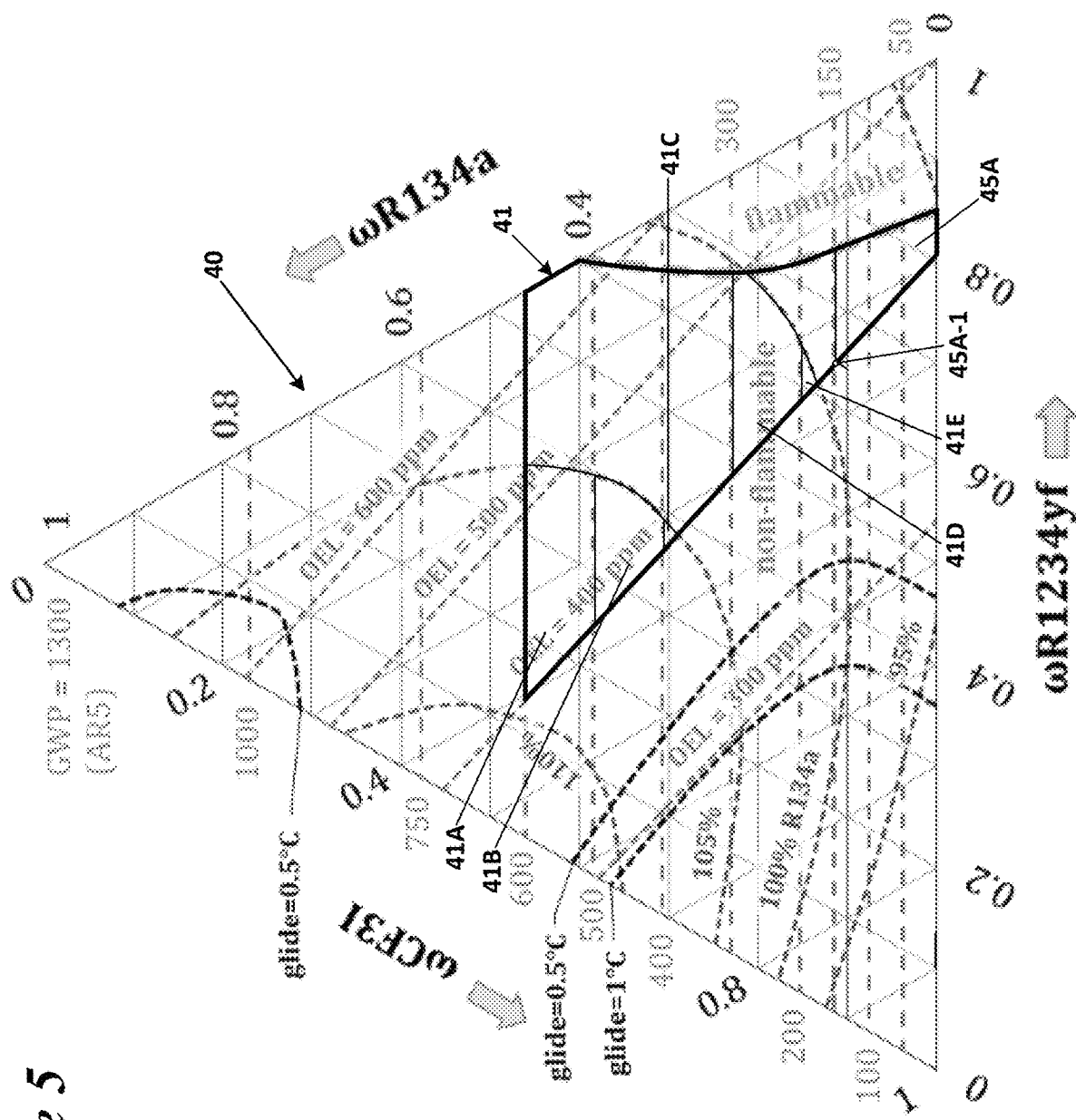

Each of FIGS. 3-5 illustrates a matrix 20, 30, 40 that is based on matrix 10 of FIG. 2 and has the same sides and vertices as the matrix 10 of FIG. 2. Each matrix 20, 30, 40 is the same as the matrix 10 of FIG. 2, except that ranges of refrigerant compositions are illustrated. Each matrix 20, 30, 40 can be used in a method of making a refrigerant composition of R1234yf, CF$_3$I, and R134a having one or more desired properties. As shown in FIG. 2, an increase in the weight percentage of R134a (shown by side 12) in a composition also increases the GWP of the composition. As also shown by FIG. 2, the weight percentage of CF$_3$I has the most significant impact on the OEL of the refrigerant composition. The capacity of a composition increases as it approaches a mixture 17 of 50 wt % CF$_3$I and 50 wt % R134a.

In an embodiment, a desired set of properties of a useful refrigerant composition includes being non-flammable, having a GWP of less than 600, and having a capacity that is not less than 95 wt % of the capacity of R134a. Based on these desired properties, a range of useful refrigerant compositions 21 is shown in the matrix 20 of FIG. 3. The useful refrigerant compositions 21 include at or about 85 wt %, or less than 85 wt % and greater than 0 wt % of R1234yf; at or about 46 wt %, or less than 46 wt % and greater than 0 wt % of R134a; and at or about 87.7%, or less than 87.7 wt % and greater than 0 wt % of CF$_3$I. In an embodiment, The useful refrigerant compositions 21 include at or about 85 wt %, or less than 85 wt % and greater than 0 wt % of R1234yf; at or about 46 wt %, or less than 46 wt % and greater than 0 wt % of R134a; and at or about 88 wt %, or less than 88 wt % and greater than 0 wt % of CF$_3$I.

The matrix 20 includes a shaded area 22 and a hatched area 23. The shaded area 22 illustrates compositions of the useful compositions 21 that have a temperature glide greater than 1° C. The hatched area 23 illustrates compositions of the useful compositions 21 that have a temperature glide of at or about or less than 1° C. and greater than 0.5° C. In some embodiments, the set of desired properties further includes a temperature glide that is at or about or less than 1° C. In such embodiments, the useful compositions 21 in FIG. 3 would not include those compositions within the shaded area 22. In some embodiments, the set of desired properties further includes a temperature glide that is at or about or less than 0.5° C. In such embodiments, the useful compositions 21 in FIG. 3 would not include those compositions within the shaded area 22 and the hatched area 23.

In an embodiment, the useful compositions 20 may include preferred compositions 25 as shown in FIGS. 3 and 4. The properties of the preferred compositions 25 is that they are non-flammable, have a GWP of less than 600, a temperature glide of 1° C. or less, and a capacity that is from 100% to 110% of the capacity of R134a. The preferred compositions 25 include from at or about 2 wt % to at or about 68 wt % of R1234yf; from at or about 9.8 wt % to at or about 46 wt % of R134a; and about 63.7 wt %, or less than 63.7 wt % and greater than 0 wt % of CF$_3$I. In an embodiment, the preferred compositions 25 include from at or about 2 wt % to at or about 68 wt % of R1234yf; from at or about 10 wt % to at or about 46 wt % of R134a; and at or about 64 wt %, or less 63.7 wt % and greater than 0 wt % of CF$_3$I.

In an embodiment, the desired property of the GWP being less than 600 may be different. In an embodiment, a composition having a GWP of less than 500 is desired. In an embodiment, a composition having a GWP of less than 400 is desired. In an embodiment, composition having a GWP of less than 300 is desired. In an embodiment, a composition having a GWP of less than 150 is desired. In such embodiments, the useful compositions 20 in FIG. 3 and the preferred compositions 25 in FIGS. 3 and 4 would include those compositions with the desired GWP.

The set of desired properties may also include a capacity relative to R134a. In an embodiment, a composition having a capacity at or about or greater than the capacity of R134a is desired. In an embodiment, a composition having a capacity at or about or greater than 105% of the capacity of R134a is desired. In an embodiment, a composition having a capacity from 100% to 110% may be desired. In an embodiment, a composition having a capacity from 100% to 105% of the capacity of R134a is desired. In an embodiment, a composition having a capacity from 105% to 110% may be desired. In such embodiments, the useful compositions 21 shown in FIG. 3 and the preferred compositions 25 shown in FIGS. 3 and 4 would include the compositions that have the desired capacity.

Specific compositions within the range of preferred compositions 25 may be desired based on the specific properties desired in an embodiment. For example, matrix 30 in FIG. 4 identifies compositions 25A-25B of the preferred compositions 25 that have properties that may be desired in a particular embodiment. Compositions 25A-25B are exemplary.

In an embodiment, compositions 25A may be selected as they have capacity that is from 105% to 110% of the capacity of R134a. Of the compositions 25A, compositions 25A-1, 25A-2, and 25A-3 may be selected in an embodiment as they have a GWP of less than 500 and provide a capacity that is from 105% to 110% of the capacity of R134a. Of compositions 25A, compositions 25A-2 and 25A-3 may be selected in an embodiment as they have a GWP of less than 400. Of Compositions 25A, compositions 25A may be selected as they have a GWP of less than 300. In an embodiment, compositions 25B may be selected as they have a GWP of 150 or less and a capacity at or about or greater than the capacity of R134a. In an embodiment, a desired set of properties of a useful refrigerant composition includes being non-flammable, having a GWP of less than 600, and having an OEL of 400 ppm or greater. Based on these desired properties, the matrix 40 of FIG. 5 illustrates a range of useful refrigerant compositions 41. The useful refrigerant compositions 41 include from at or about 13.5 wt % to at or about 85 wt % of R1234yf; at or about 46 wt %, or less than 46 wt % and greater than 0 wt % of R134a; and at or about 40.5 wt %, or less than 40.5 wt % and greater than 0 wt % of CF$_3$I. In an embodiment, the useful refrigerant compositions 41 include from at or about 14 wt % to at or about 85 wt % of R1234yf; at or about 46 wt %, or less than 46 wt % and greater than 0 wt % of R134a; and at or about 41 wt %, or less than 41 wt % and greater than 0 wt % of CF$_3$I.

In an embodiment, the desired property of the GWP being less than 600 may be different. In an embodiment, a composition having a GWP of less than 500 is desired. In an embodiment, a composition having a GWP of less than 400 is desired. In an embodiment, a composition having a GWP of less than 300 is desired. In an embodiment, a composition that has a GWP of less than 150 is desired. In such embodiments, the useful compositions 41 in FIG. 5 would include those compositions that have the desired GWP.

The set of desired properties may include a specific capacity. In an embodiment, a composition having a capacity at or about or greater than the capacity of R134a is desired. In an embodiment, a composition having a capacity at or about or greater than 105% of the capacity of R134a is desired. In such embodiments, the useful compositions 41 in FIG. 5 would include those compositions that have the desired capacity.

Specific compositions within the range of useful compositions 25 may be desired based on the specific properties desired in an embodiment. For example, matrix 40 in FIG. 5 identifies compositions 41A-41E and 45A of useful compositions 41 that have properties that are desired in a particular embodiment. Compositions 41A-41E and 45A are exemplary.

In an embodiment, compositions 41A, 41B, or 41C may be selected as they have a capacity that is at or about or greater than 105% of the capacity of R134a while also being less than 110% of the capacity of R134a. In an embodiment, compositions 41B or 41C may be selected as they have a GWP of less than 500 and a capacity that is at or about or greater than 105% of the capacity of R134a. In an embodiment, compositions 41C may be selected as they have a GWP of less than 400 and a capacity that is at or about or greater than 105% of the capacity of R134a. In an embodiment, compositions 41D or 41E may be selected as they have a GWP of less than 300 and a capacity that is at or about or greater than the capacity of R134a. In an embodiment, compositions 41E may be selected as they have a GWP of less than 200 and a capacity that is at or about or greater than the capacity of R134a.

In an embodiment, compositions 45A are preferred as they have a GWP of less than 150. Of compositions 45A, composition 45A-1 may be selected in an embodiment as it provides the highest capacity. Composition 45A-1 is at or about 64 wt % R1234yf, at or about 11.5 wt % R134a, and at or about 24.5 wt % $CF_3I$ by weight. Table 2 below shows various properties of composition 45A-1.

TABLE 2

Properties of Composition 45A-1

| | |
|---|---|
| Capacity* | 99.4% |
| Coefficient of Performance* | 97.2% |
| Change in Compressor Discharge Temperature* | −12° F. |
| Mass Flow Rate* | 140% |
| Density (Liquid Phase)* | 102% |
| Temperature Glide | 0.3° F. |
| Compressor Pressure Ratio (Discharge Pressure:Suction Pressure)* | 92% |

*Property is relative to R134a (100% being equivalent to R134a).

Figure 6A:
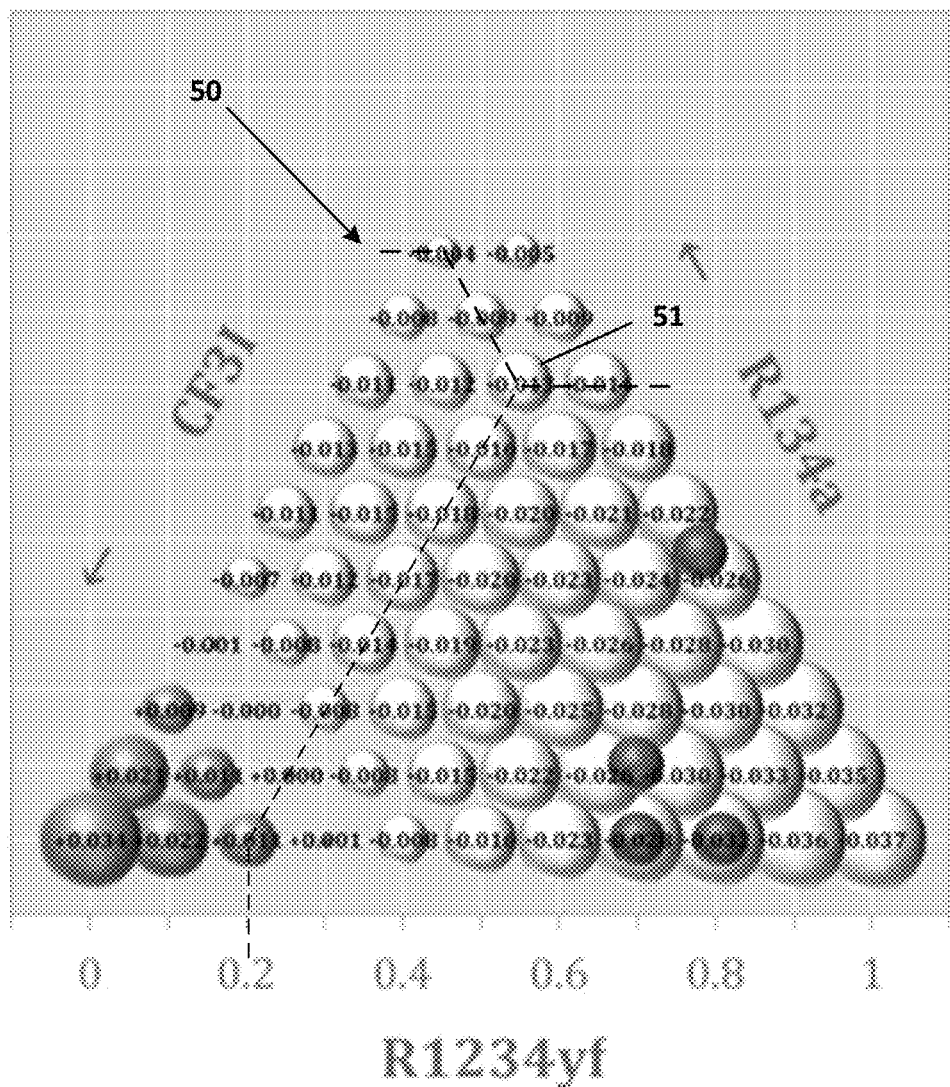
FIGS. 6A-6D each illustrate a matrix of a thermodynamic property of compositions of R1234yf, R134a, and $CF_3I$.
Figure 6B:
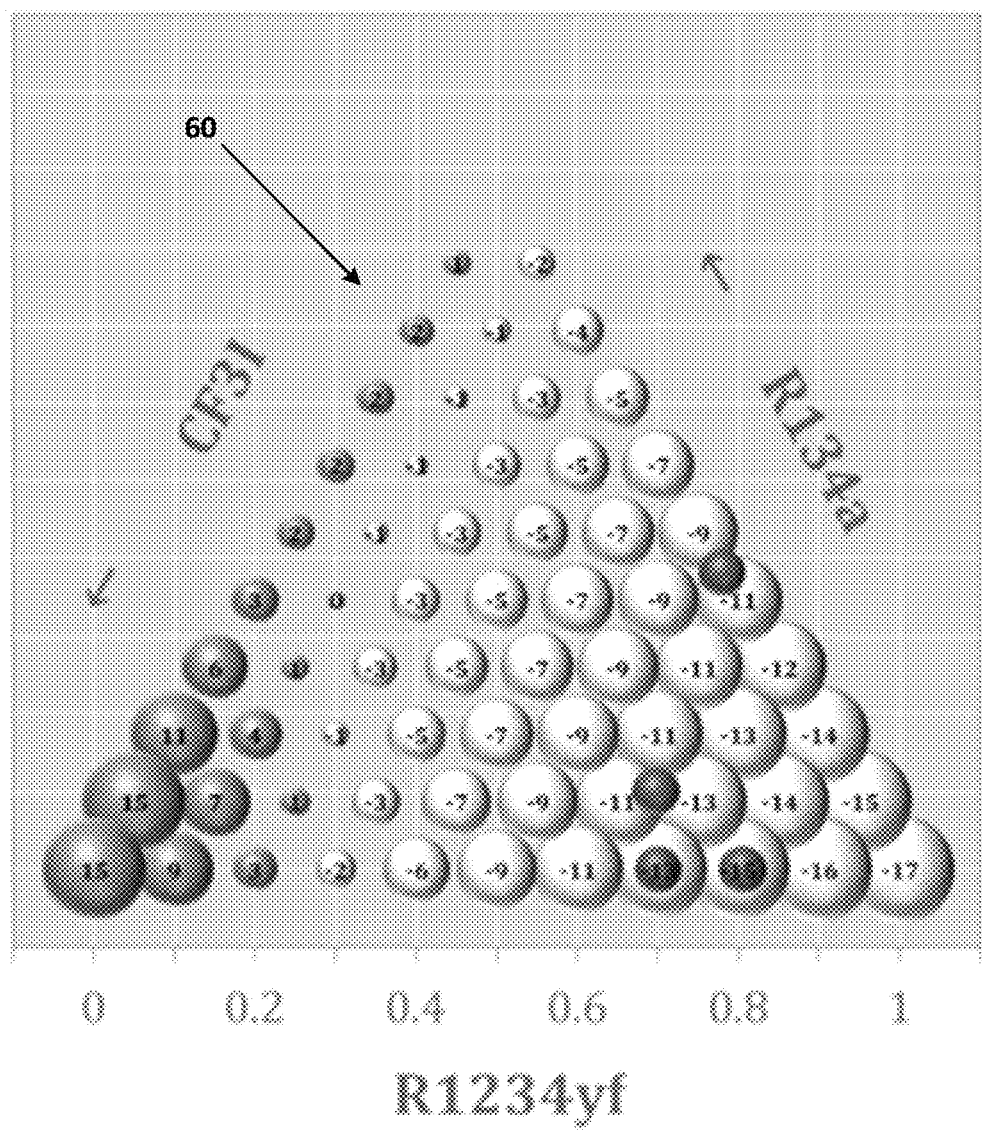
Figure 6C:
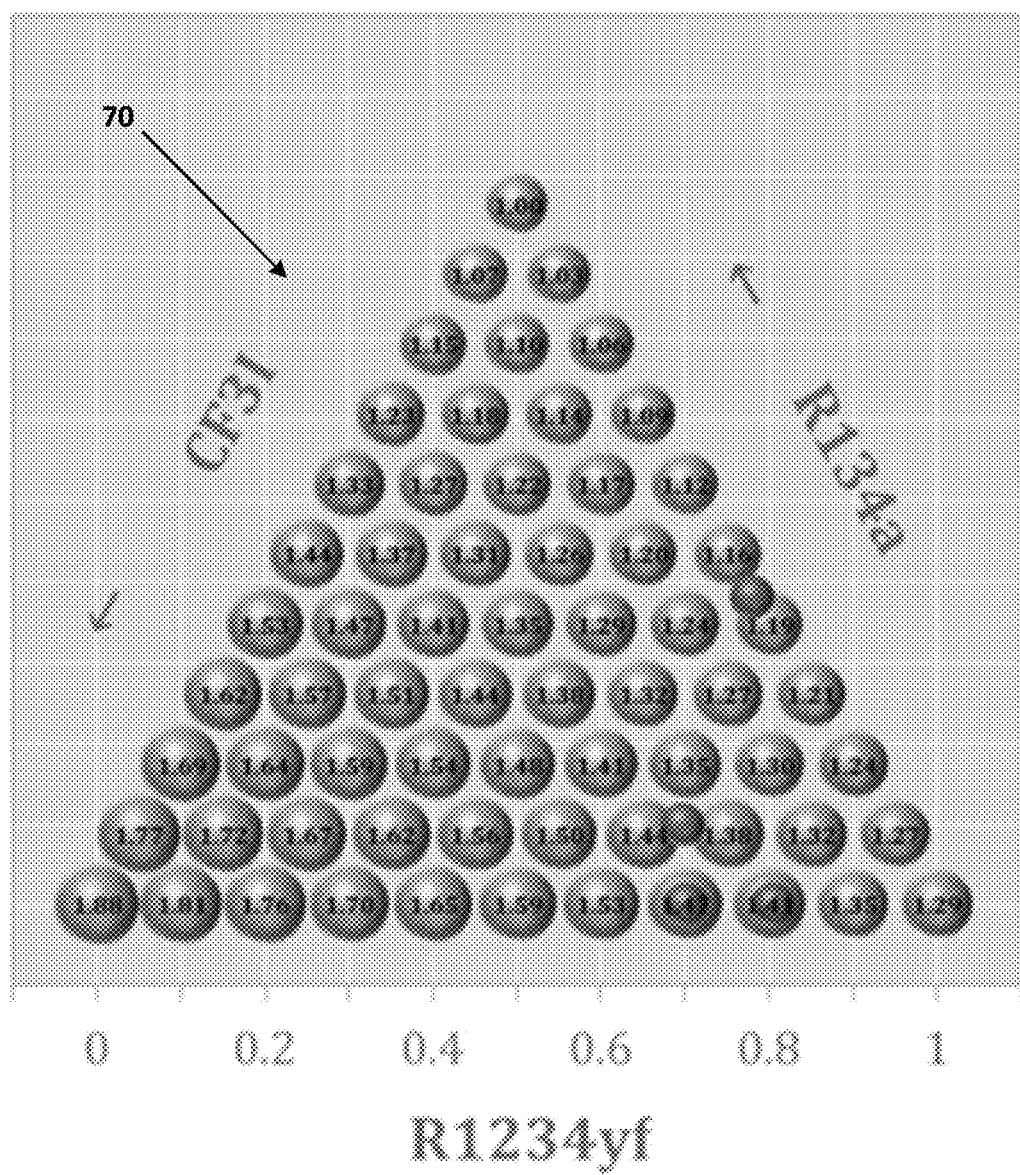
Figure 6D:
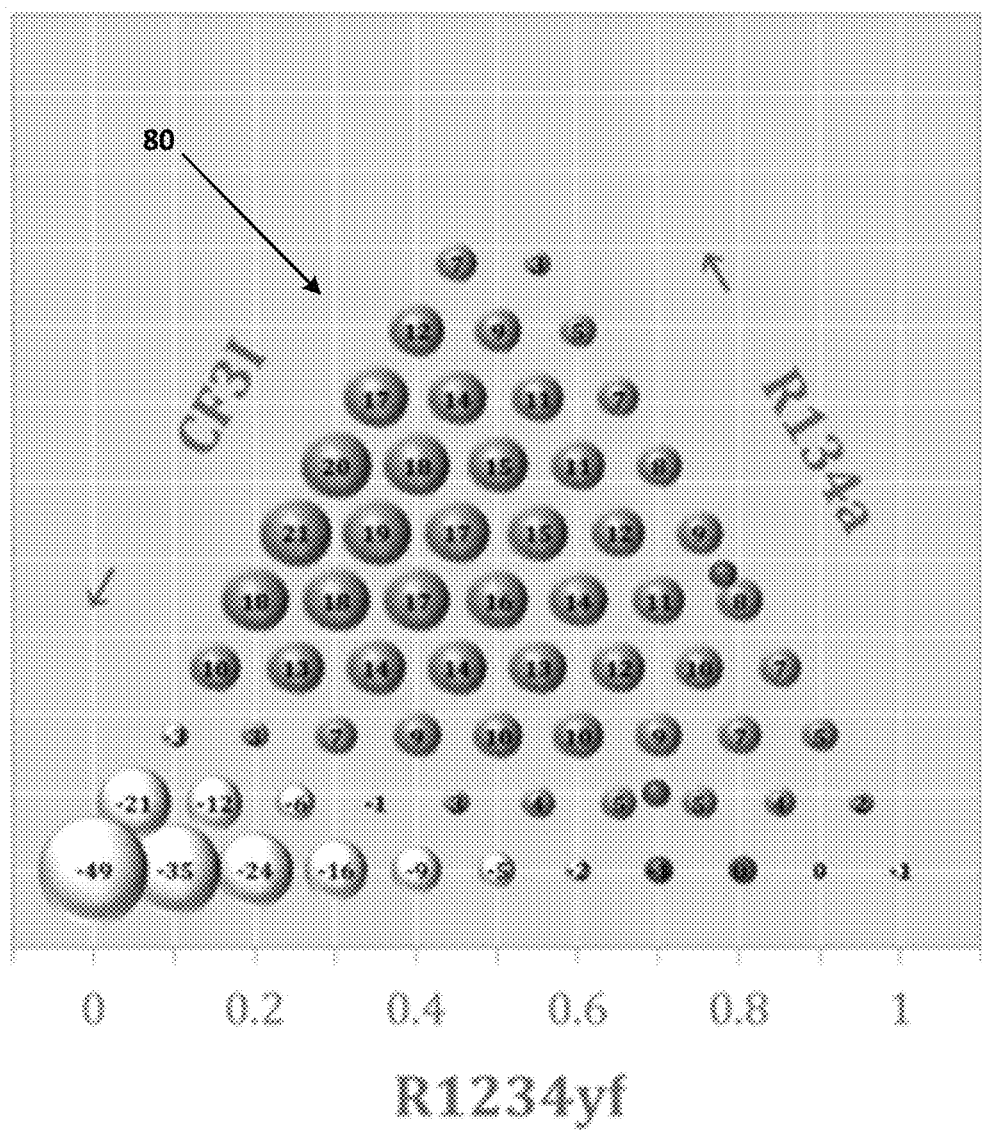

Each of FIGS. 6A-6D illustrates a matrix of a thermodynamic property for compositions of R1234yf, R134a, and $CF_3I$ by weight percentage. Compositions in each matrix 50, 60, 70, 80 are calculated similarly to the matrixes 10, 20, 30, 40 in FIGS. 2-6. Accordingly, in FIGS. 6A-6D, the axes of R134a are horizontal and parallel to the side for R1234yf, the axes for R1234yf are parallel to the side for $CF_3I$, and the axes for $CF_3I$ are parallel to the side for R134a. Each matrix 50, 60, 70, 80 shows values at each 10 wt % of R1234yf, R134a, and $CF_3I$ (except for 100 wt % R134a in FIGS. 6A, 6B, and 6D). The values at 100 wt % R134a in FIGS. 6A, 6B, and 6D are not shown because they are zero. For example, composition 51 in FIG. 6A corresponds to a composition of 20 wt % R1234yf, 70 wt % R134a, and 10 wt % $CF_3I$.

FIG. 6A illustrates a matrix 50 of coefficients of performance (relative to R134a) for compositions of R1234yf, R134a, and $CF_3I$. FIG. 6B illustrates a matrix 60 of compressor discharge temperatures in Fahrenheit (relative to R134a) for compositions of R1234yf, R134a, and $CF_3I$. FIG. 6C illustrates a matrix 70 of mass flow rates (relative to R134a) for compositions of R1234yf, R134a, and $CF_3I$. FIG. 6D illustrates a matrix 80 of operating pressures in PSI (relative to R134a) for compositions of R1234yf, R134a, and $CF_3I$.

Performance of a refrigerant composition may be based on one or more of a coefficient of performance, compressor discharge temperature, mass flow rate, and operating pressure. In an embodiment, the desired set of properties includes one or more of a coefficient of performance (relative to R134a), compressor discharge temperature (relative to R134a), mass flow rate (relative to R134a), and operating pressure (relative to R134a). In an embodiment, a composition that has a coefficient of performance of greater than 97% relative to R134a may be preferred. In an embodiment, a composition that results in a change in the compressor change discharge temperature, relative to R134a, that is at or about or less than 20° F. may be preferred. In an embodiment, a composition that has results in a mass flow rate of less than 1.5 times greater than R134a may be desired. In an embodiment, a composition that has results in a mass flow rate of less than 1.2 times greater than R134a may be desired. In an embodiment, a composition that has results in a mass flow rate of less than 1.1 times greater than R134a may be desired. In an embodiment, a composition that results in an operating pressure of about at or about R134a may be desired. In an embodiment, composition that results in a change in the condenser operating pressure, relative to R134a, of less than less than 20 psid may be desired. In an embodiment, a method of making a refrigerant composition utilizes one or more of the matrices of FIGS. 2-6D so that the refrigerant composition has a desired set of properties.

Figure 7:
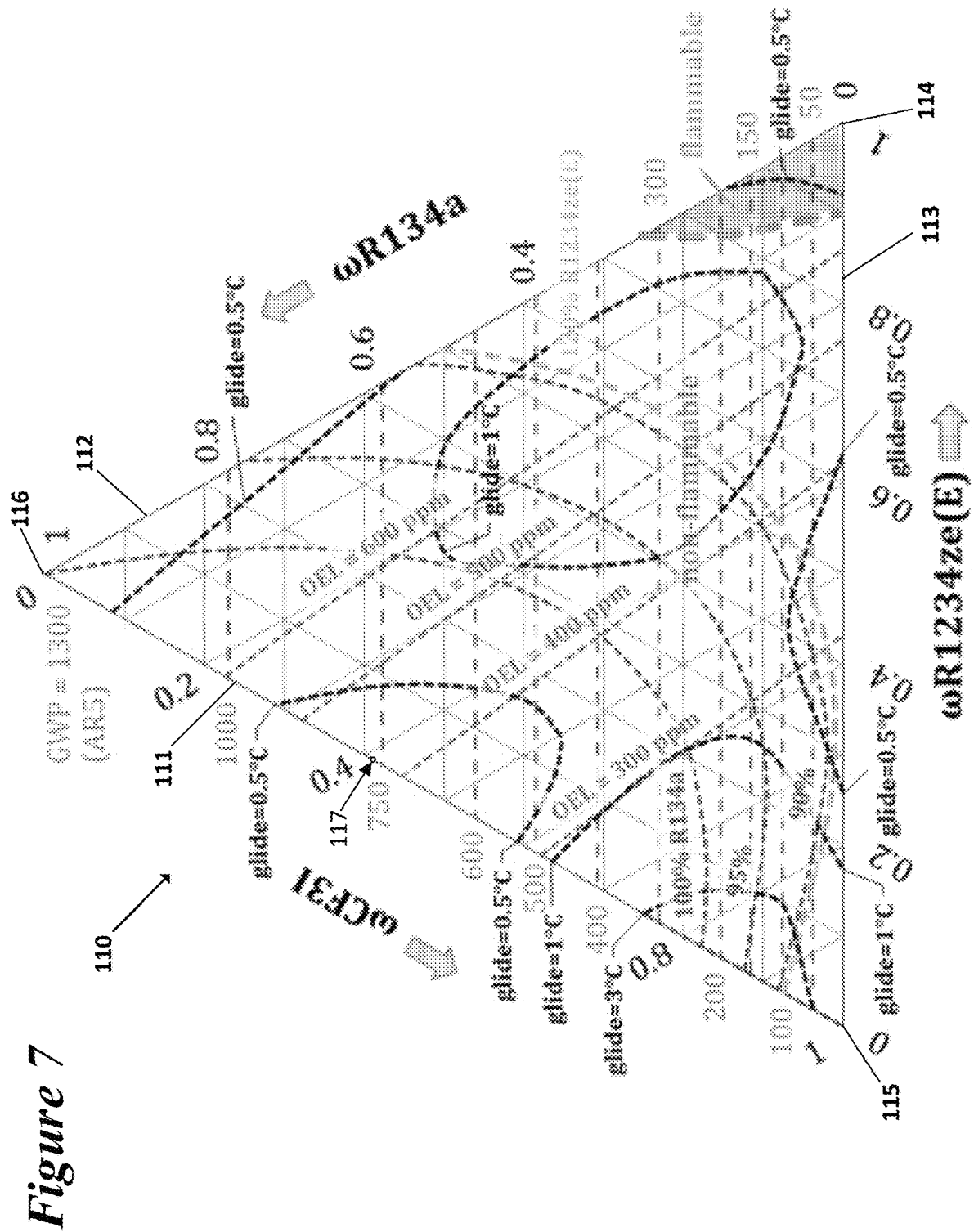
FIG. 7 illustrates a matrix of compositions of R1234ze(E), R134a, and $CF_3I$ showing plots of GWP, flammability, temperature glide, capacity (relative to R134a), and OEL.

FIG. 7 illustrates a matrix 110 that was developed to show plots of GWP, flammability, temperature glide, capacity (relative to R134a), and OEL as a function of the concentration of R1234ze(E), R134a, and $CF_3I$. Each side 111, 112, 113 of the triangle corresponds to a percent (by weight) of R1234ze(E), R134a, or $CF_3I$. Each vertex 14, 15, 16 corresponds to composition of 100 wt % R1234ze(E), R134a, and $CF_3I$, respectively. Properties (e.g., GWP, capacity (relative to R134a), flammability, temperature glide, OEL) of a refrigerant composition with weight percentages of R1234ze (E), R134a, and $CF_3I$ can be estimated using the matrix 110.

Properties of the compositions for the matrix 110 were estimated using a thermodynamic model. The boundary between flammable and non-flammable compositions is shown in the lower right corner of matrix 110 by a large dashed line. Flammable compositions are on the right side of the boundary and non-flammable compositions are on the left side of the boundary. The boundary is estimated based on known characteristics of R1234ze(E), R134a, $CF_3I$, the flammability of R1234ze(E) relative to R1234yf, and the flame suppressant properties of $CF_3I$ relative to R134a. OEL and GWP are based on the GWP and OEL of the individual components. The flammability boundary is estimated based on known characteristics of the individual components and various binary mixtures of the individual components. Accordingly, the amount of each refrigerant in a composition along the flammability boundary may, for example, vary by about 5 percent in an embodiment. It should be appreciated the compositions and ranges shown and/or described may be updated based on further testing to confirm the location of the flammability boundary.

The OEL of the compositions in FIG. 7 are calculated using the methodology described in ASHRAE 34 in a similar manner as described above. Accordingly, the lines of OELs shown in FIGS. 7-10 may be revised if the OEL of $CF_3I$ or the refrigerants is changed.

Each of FIGS. 8-11 illustrates a matrix 120, 130, 140 that is based on matrix 110 of FIG. 7 and has the same sides and vertices as the matrix 110 of FIG. 7. Each matrix 120, 130, 140 is the same as the matrix 110 of FIG. 7, except that ranges of certain refrigerant compositions are illustrated. Each matrix 120, 130, 140 can be used in a method of making a refrigerant composition to make a refrigerant of R1234ze(E), $CF_3I$, and R134a with a set of desired properties. As shown in FIG. 7, an increase in the weight percent of R134a (shown by side 112) in a refrigerant composition results in an increase in the composition's GWP. As also shown by FIG. 7, weight percentage of $CF_3I$ in the composition has the most significant impact on the OEL of the composition. The capacity of a refrigerant composition increases as it approaches a mixture 117 of approximately 51.5 wt % $CF_3I$ and 48.5 wt % R134a. A mixture of 51.5 wt % CF3I and 48.5 wt % R134a has a coefficient of performance, relative to R134a, of about 1.122.

In an embodiment, a desired set of properties of a refrigerant composition includes being non-flammable, having a GWP of less than 600, and having a capacity that is at or about or greater than 90% of the capacity of R134a. Based on these properties, a range of useful refrigerant compositions 121 is shown in matrix 120 of FIG. 8. The useful refrigerant compositions 121 include at or about 54.8 wt %, or less than 54.8 wt % and greater than 0 wt % of R1234ze (E); from at or about 1.9 wt % to at or about 46 wt % of R134a; and from at or about 4.5 wt % to at or about 91 wt % of $CF_3I$. In an embodiment, the useful refrigerant compositions 121 include at or about 55 wt %, or less than 55 wt % and greater than 0 wt % of R1234ze(E); from at or about 2 wt % to at or about 46 wt % of R134a, and from at or about 5 wt % to at or about 91 wt % of $CF_3I$ The desired property of the GWP being less than 600 may be different. In an embodiment, a composition having a GWP of less than 500 is desired. In an embodiment, a composition having a GWP of less than 400 is desired. In an embodiment, a composition having a GWP of less than 300 is desired. In an embodiment, a composition having a GWP of less than 150 is desired. In such embodiments, the useful compositions 121 shown in FIG. 8 and preferred compositions 125 shown in FIGS. 8 and 9 would include those compositions that have the desired GWP.

The desired property of the capacity being at or about or less than 90% of the capacity of R134a may be different. In an embodiment, a composition having a capacity at or about or greater than 90% of the capacity of R134a is desired. In an embodiment, a composition having a capacity at or about or greater than 95% of the capacity of R134a is desired. In an embodiment, a composition having a capacity at or about or greater than the capacity of R134a is desired. In such embodiments, the useful compositions 121 shown in FIG. 8 and the preferred compositions 125 shown in FIGS. 8 and 9 would include those compositions that have the desired capacity.

The matrix 120 includes shaded area 122, 123. The shaded areas 122, 123 illustrate compositions of the useful compositions 121 that have a temperature glide of greater than 1° C. In some embodiments, the set of desired properties includes a temperature glide that is at or about or less than 1° C.

Figure 8:
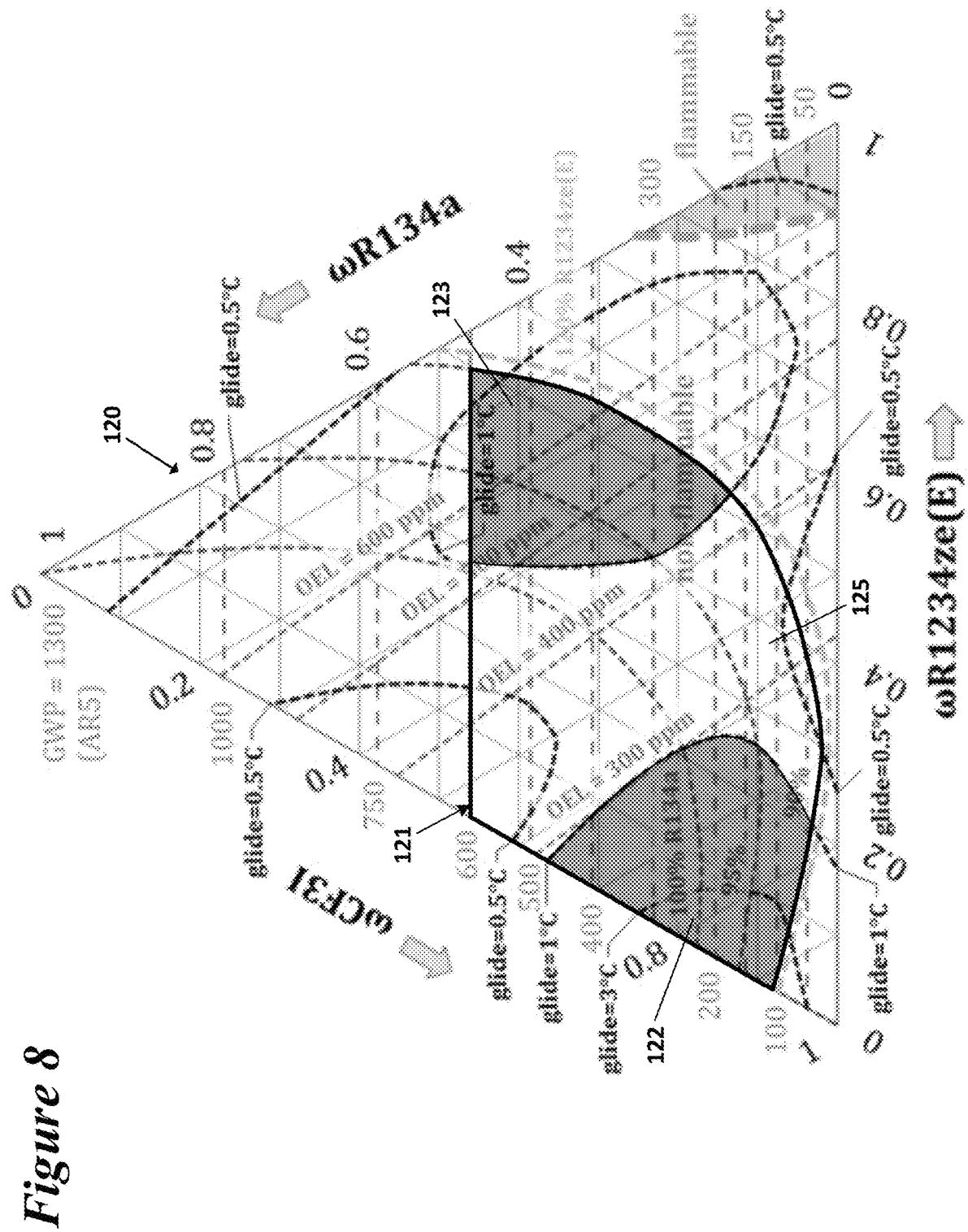
FIGS. 8-10 each illustrate a matrix based on the matrix of FIG. 7 that can be used to select a refrigerant composition with a desired set of properties in an embodiment.
Figure 9:
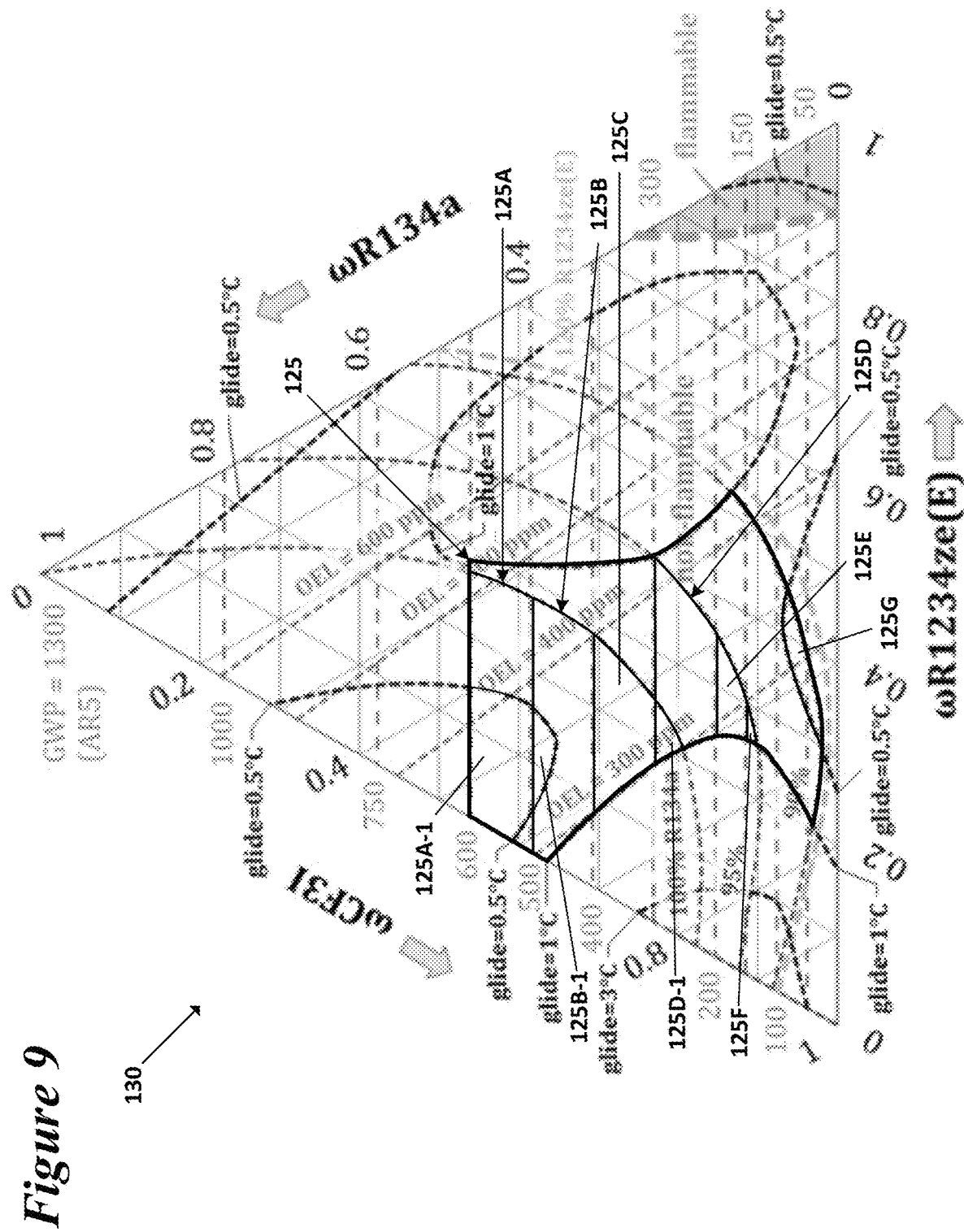

The useful compositions 121 may include preferred compositions 125 as shown in FIGS. 8 and 9. The properties of the preferred compositions 125 is that they are non-flammable, have a GWP of less than 600, a temperature glide of 1° C. or less, and a capacity that is at least 90% of the capacity of R134a. The preferred refrigerant compositions 125 include at or about or less than 52.6 wt % and greater than 0 wt % of R1234ze(E), from 1.9 wt % to 46 wt % of R134a, and from 25.2 wt % to 76.2 wt % of $CF_3I$. As similarly discussed previously, these ranges may be updated if further testing determines that the OEL of $CF_3I$ is revised to be greater. For example, maximum amount in the range of $CF_3I$ may be greater if the OEL is determined to be larger value than 150 ppm.

Specific compositions within the range of the preferred compositions 125 may have specific properties that are desired in a particular embodiment. For example, matrix 130 in FIG. 9 identifies compositions 125A-125G of the preferred compositions 125 that have properties that may be desired in a particular embodiment. Compositions 125A-125G are exemplary compositions.

In an embodiment, compositions 125A, 125B, 125C and 125D-1 may be selected as they have a capacity that is at or about or greater than the capacity of R134a. Of the compositions 125A, compositions 125A-1 may be selected in an embodiment as they have a temperature glide that is at or about or less than 0.5° C. In an embodiment, compositions 125B, 125C, and 125D-1 may be selected as they have GWP of less than 500 and a capacity that is at or about or greater than the capacity of R134a. Of the compositions 125B, compositions 125B-1 may be selected in an embodiment as they have a temperature glide that is at or about or less than 0.5° C. In an embodiment, compositions 125C and 125D-1 may be selected as they have a GWP of less than 400 and a capacity at or about or greater than the capacity of R134a. In an embodiment, compositions 125D may be selected as they have a GWP of less than 300 and a capacity that is at or about or greater than 95% of the capacity of R134a. Of compositions 125D, compositions 125D-1 may be selected in an embodiment as they have a capacity that is at or about or greater than the capacity of R134a. In an embodiment, compositions 125E may be selected as they have a GWP of less than 200 and a capacity that is at or about or greater than 95% of the capacity of R134a. In an embodiment, compositions 125F may be selected as they have a GWP of less than 150 and a capacity that is at or about or greater than 95% of the capacity of R134a. In an embodiment, compositions 125G may be selected as they have GWP of less than 150 and a temperature glide that is at or about or less than 0.5° C.

In an embodiment, a desired set of properties of a useful refrigerant composition includes being non-flammable, having a GWP of less than 600, and having an OEL of 400 ppm or greater. Based on these desired properties, a range of useful refrigerant compositions 141 of R1234ze(E), R134a, and $CF_3I$ is shown in the matrix 140 of FIG. 10. The useful refrigerant compositions 141 include from at or about 10 wt % to at or about 90 wt % of R1234ze(E); at or about 46 wt %, or less than 46 wt % and greater than 0 wt % of R134a; and at or about 43.5 wt %, or less than 43.5 wt % and greater than 0 wt % of $CF_3I$. In an embodiment, the useful refrigerant compositions 141 may include from at or about 10 wt % to at or about 90 wt % of R1234ze(E); at or about 46 wt %, or less than 46 wt % and greater than 0 wt % of R134a; and at or about 44 wt %, or less than 44 wt % and greater than 0 wt % of $CF_3I$.

As similarly discussed above, the lines for OEL may be revised upon a determination that the OEL of CF3I is greater than described. It should be appreciated that the ranges shown and/or described may be similarly revised. For example, maximum amount in the range of $CF_3I$ may be greater if the OEL is determined to be larger value than 165 ppm.

In an embodiment, the desired property of the GWP being less than 600 may be different. In an embodiment, a composition having a GWP of less than 500 is desired. In an embodiment, a composition having a GWP of less than 400 is desired. In an embodiment, a composition having a GWP of less than 300 is desired. In an embodiment, a composition having a GWP of less than 150 is desired. In such embodiments, the useful compositions 141 in FIG. 10 would include those compositions that have the desired GWP.

In an embodiment, set of desired properties may include a specific capacity. In an embodiment, a composition having a capacity at or about or greater than 90% of the capacity of R134a is desired. In an embodiment, a composition having a capacity at or about or greater than 95% of the capacity of R134a is desired. In an embodiment, a composition having a capacity at or about or greater than the capacity of R134a is desired. In such embodiments, the useful compositions 141 in FIG. 10 would include those compositions that have the desired capacity.

Figure 10:
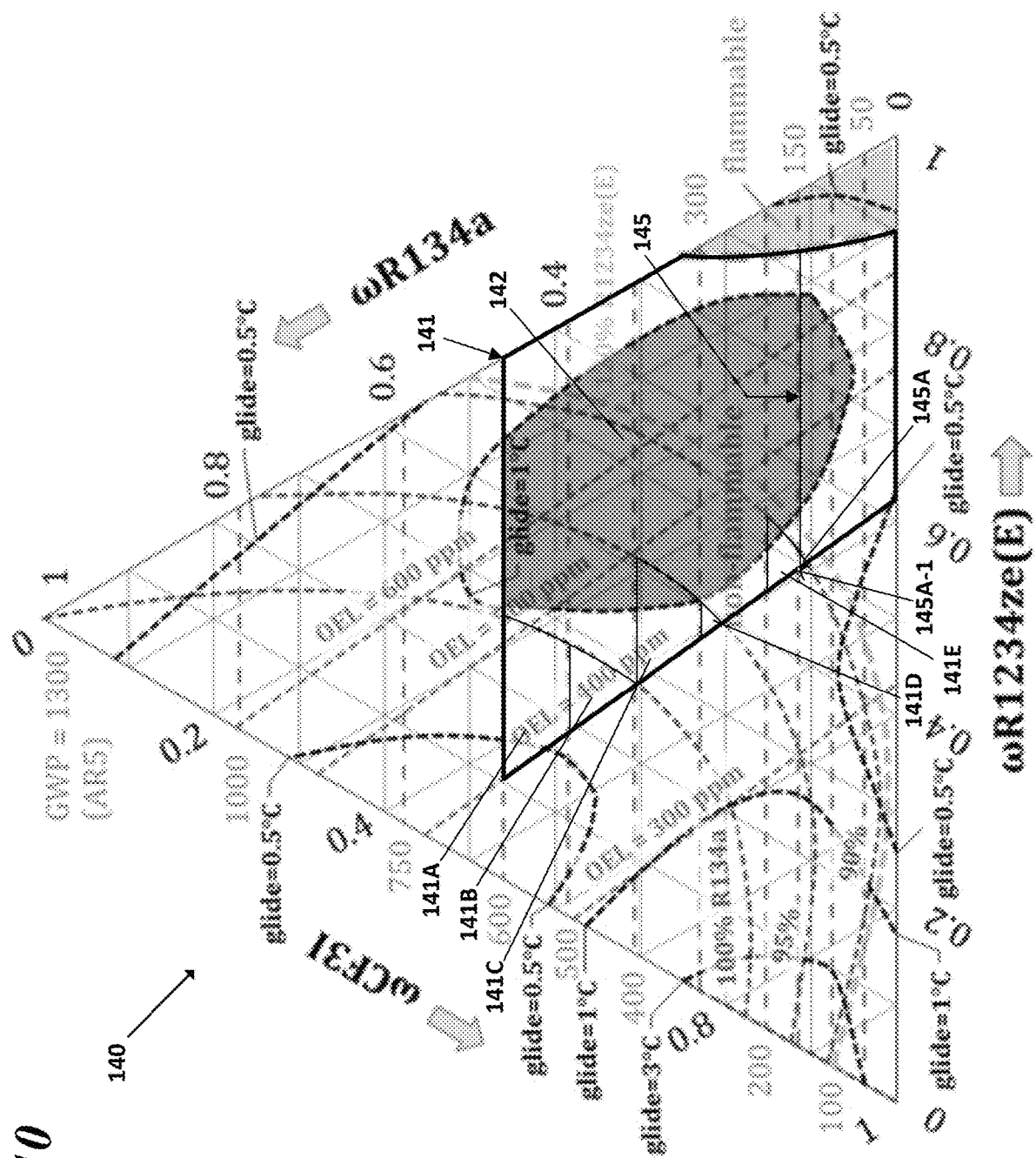

FIG. 10 includes shaded area 142. The shaded area 142 shows those compositions of the useful compositions 141 that have a temperature glide of greater than 1° C. In an embodiment, a composition having a temperature glide of 1° C. or less may be desired. In such embodiments, useful compositions 141 shown in FIG. 10 may not include those compositions that have a temperature glide greater than 1° C. Accordingly, in such embodiments, each of compositions 141C, 141E, and 145 shown in FIG. 10 would be modified to not include any composition in the shaded area 142.

Specific compositions within the range of useful compositions 141 in FIG. 10 may be desired based on the specific properties desired in an embodiment. For example, matrix 140 of FIG. 10 identifies ranges of compositions 141A-141E and 145A that may be desired in an embodiment. Compositions 141A-141G and 145A are exemplary.

In an embodiment, compositions 141A and 141B may be selected as they have a capacity that is at or about or greater than 100% of the capacity of R134a. In an embodiment, compositions 141B may be selected as they have a GWP of less than 500 and a capacity that is at or about or greater than 100% of the capacity of R134a. In an embodiment, compositions 141C and 141 D may be selected as they have a GWP of less than 400 and a capacity that is at or about or greater than 95% of the capacity of R134a. In an embodiment, compositions 141D may be selected as they have a GWP that is less than 300 and a capacity that is at or about or greater than the 90% of the capacity of R134a. In an embodiment, compositions 141E may be selected as they have a GWP of less than 200 and a capacity that is at or about or greater than 90% of the capacity of R134a.

In an embodiment, compositions 145A of useful compositions 141 are preferred as they have a GWP of less than 150. The compositions 145 include from at or about 49.5 wt % to at or about 90 wt % of R1234ze(E); at or about 11.5 wt %, or less than 11.5 wt % and greater than 0 wt % of R134a; and from at or about 6.6 wt % to at or about 39 wt % of $CF_3I$. In an embodiment, compositions 145 may include at or about 49 wt % to at or about 90 wt % of R1234ze(E); at or about 11 wt %, or less than 11 wt % and greater than 0 wt % of R134a; and from at or about 6 wt % to at or about 39 wt % of $CF_3I$.

Of compositions 145, compositions 145A may be selected as they have a capacity that is at or about or greater than 90% of the capacity of R134a. Of compositions 145A, composition 145A-1 may be selected in an embodiment as it provides the greater capacity. Composition 145A-1 is at or about 49.5 wt % of 1234ze(E), at or about 11.5 wt % of R134a, and at or about 39 wt % of $CF_3I$. Table 3 below shows various properties of composition 145A-1.

TABLE 3

| Properties of Composition 145A-1 | |
|---|---|
| Capacity* | 90.5% |
| Coefficient of Performance* | 99.3% |
| Change in Compressor Discharge Temperature* | −5° F. |
| Mass Flow Rate* | 136% |
| Density (Liquid)* | 1.14% |
| Temperature Glide | 0.9° F. |
| Compressor Pressure Ratio (Discharge Pressure:Suction Pressure)* | 97% |

*Property is relative to R134a (100% being equal to R134a).

Figure 11A:
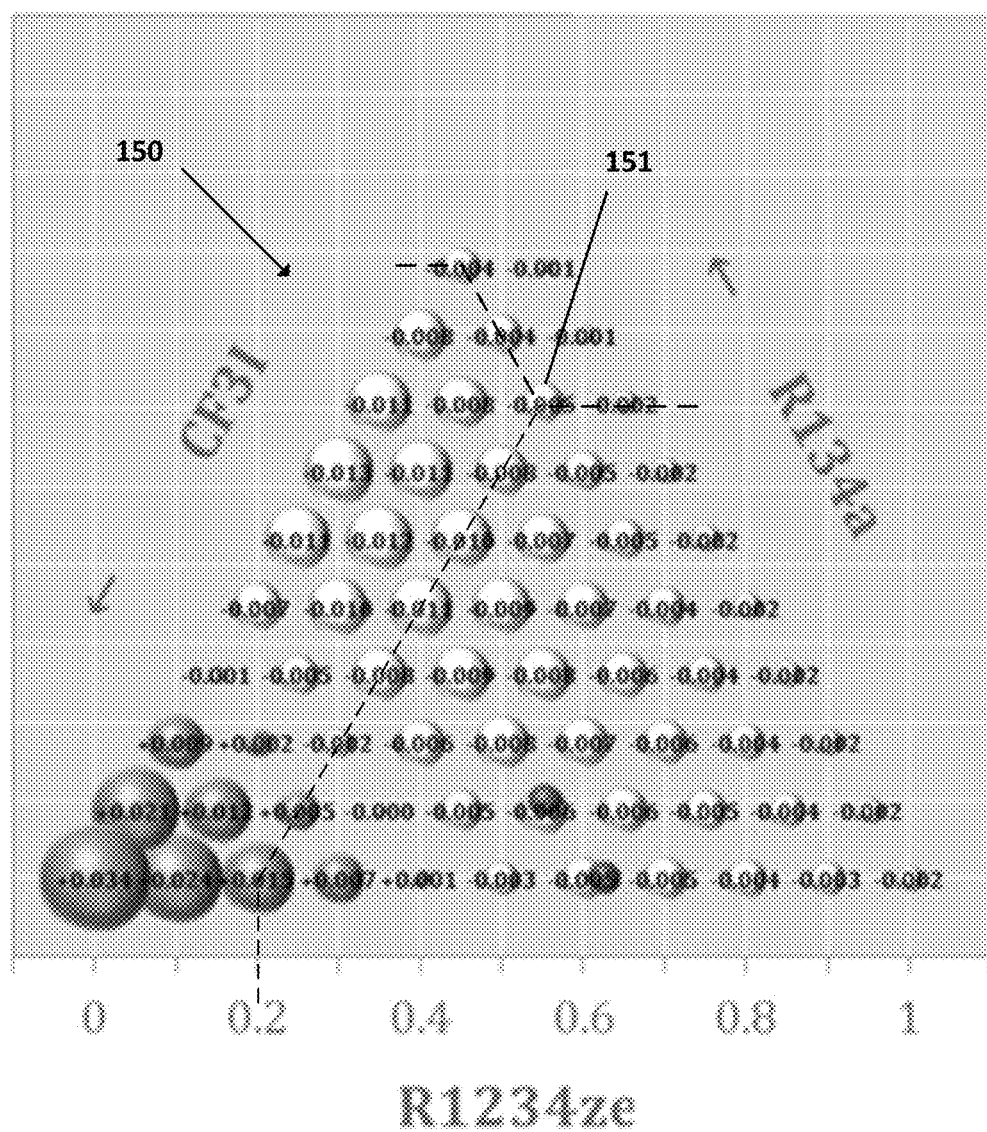
FIGS. 11A-11D each illustrate a matrix of a thermodynamic property of compositions of R1234ze(E), R134a, and CF$_3$I.
Figure 11B:
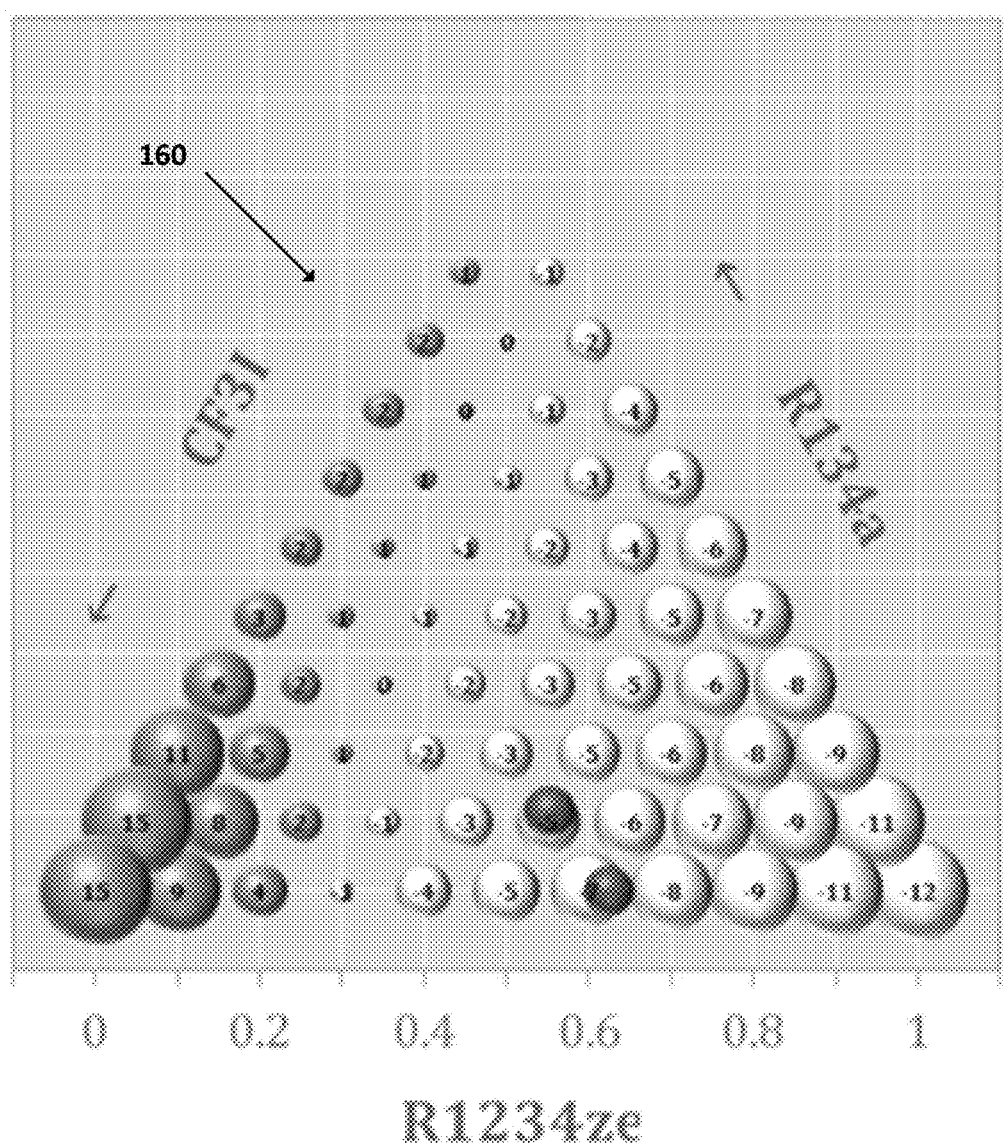
Figure 11C:
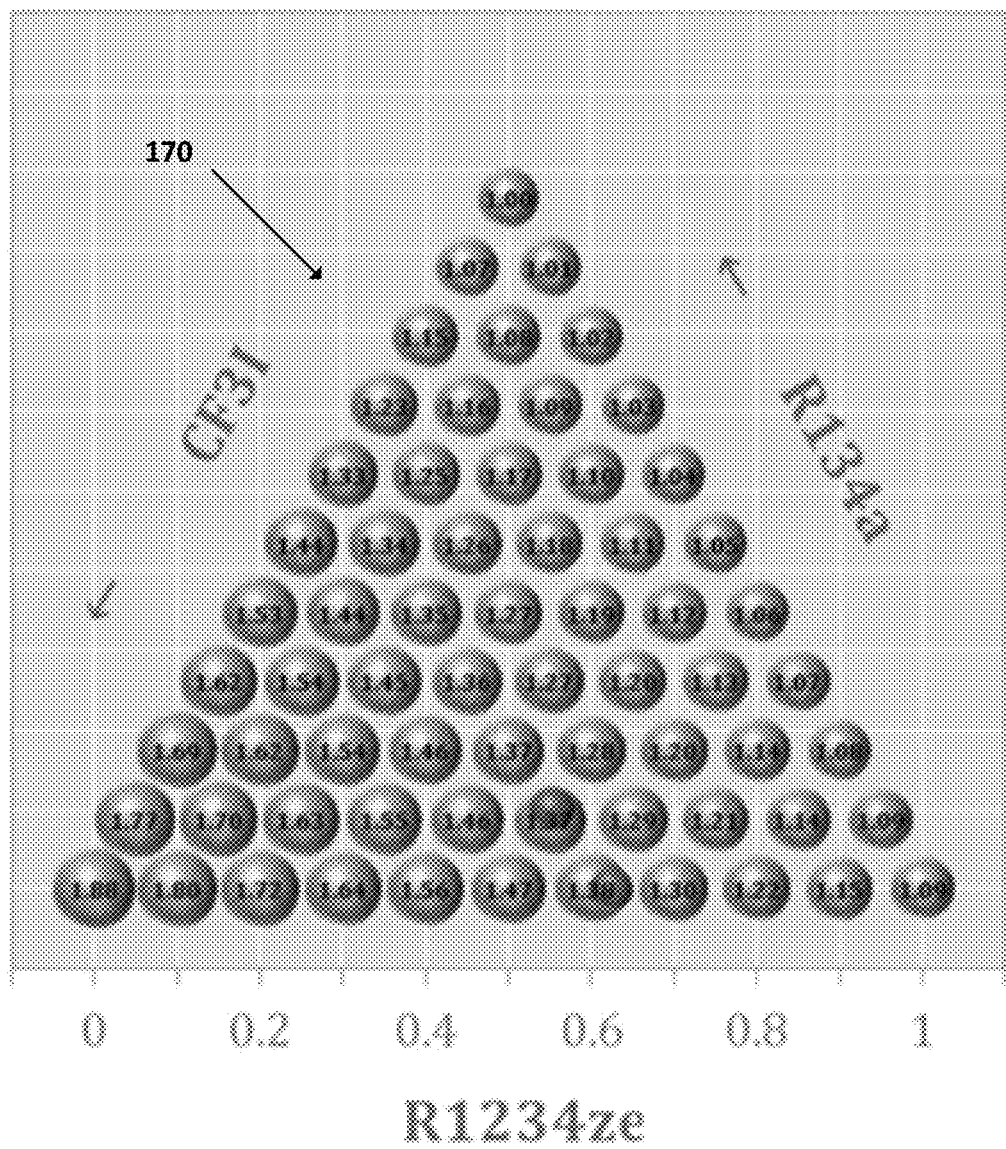
Figure 11D:
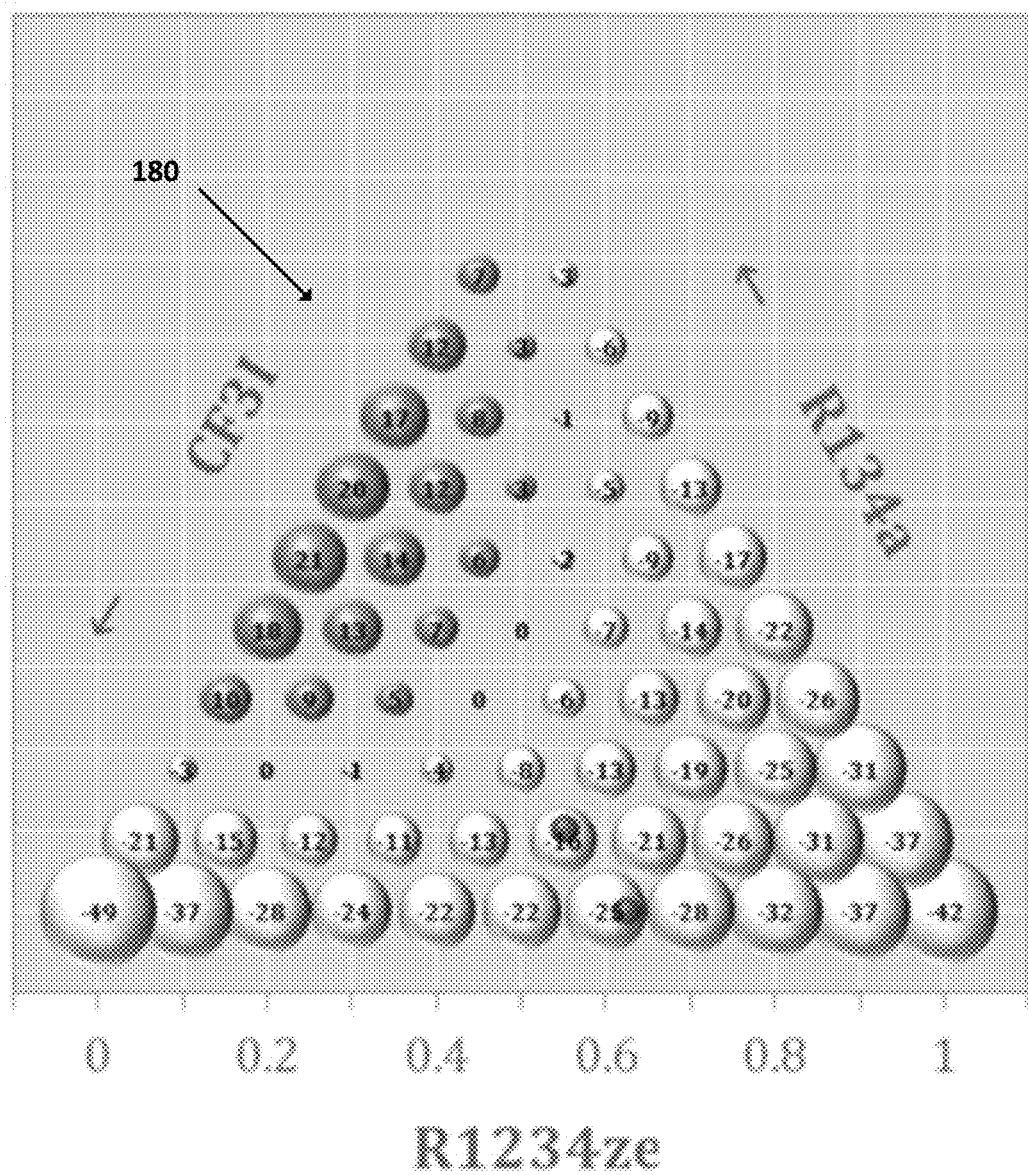

Each of FIGS. 11A-11D illustrates a matrix 150, 160, 170, 180 of a thermodynamic property for compositions of R1234ze(E), R134a, and $CF_3I$. Compositions in each matrix 150, 160, 170, 180 are calculated similarly to each matrix 110, 120, 130, 140 in FIGS. 7-10. Accordingly, the axes for R134a are horizontal and parallel to the side for R1234ze(E), the axes for R1234ze(E) are parallel to the side for $CF_3I$, and the axes for $CF_3I$ are parallel to the side for R134a. Each matrix 150, 160, 170, 180 shows a value for its respective thermodynamic property at 10 wt % increments of R1234yf, R134a, and $CF_3I$ (except for 100 wt % R134a in FIGS. 11A, 11B, and 11D). A value for 100 wt % R134a in FIGS. 11A, 11B, and 11D is not shown as the value is zero. For example, composition 151 in FIG. 11A is 20 wt % R1234ze(E), 70 wt % R134a, and 10 wt % $CF_3I$.

FIG. 11A illustrates a matrix 150 of coefficients of performance (relative to R134a) for compositions of R1234ze (E), R134a, and $CF_3I$. FIG. 11B illustrates a matrix 160 of compressor discharge temperatures in Fahrenheit (relative to R134a) for compositions of R1234ze(E), R134a, and $CF_3I$. FIG. 11C illustrates a matrix 170 of mass flow rates (relative to R134a) for compositions of R1234ze(E), R134a, and $CF_3I$. FIG. 11D illustrates a matrix 180 of operating pressures in PSI (relative to R134a) for compositions of R1234ze(E), R134a, and $CF_3I$.

Performance of a refrigerant composition may be based on a coefficient of performance, compressor discharge temperature, mass flow rate, and/or operating pressure. In an embodiment, a composition having a specific coefficient of performance (relative to R134a), compressor discharge temperature (relative to R134a), mass flow rate (relative to R134a), and/or operating pressure (relative to R134a) may be desired. In an embodiment, a composition that has a coefficient of performance of greater than 97% relative to R134a may be preferred. In an embodiment, a composition that results in a change in the compressor change discharge temperature, relative to R134a, that is at or about or less than 20° F. may be preferred. In an embodiment, a composition that has results in a mass flow rate of less than 1.5 times greater than R134a may be desired. In an embodiment, a composition that has results in a mass flow rate of less than 1.2 times greater than R134a may be desired. In an embodiment, a composition that has results in a mass flow rate of less than 1.1 times greater than R134a may be desired. In an embodiment, a composition that results in an operating pressure of about at or about the operating pressure of R134a may be desired. In an embodiment, composition that results in a change in the condenser operating pressure, relative to R134a, of less than less than 20 psid may be desired. In an embodiment, a method of making a refrigerant composition utilizes one or more of the matrices of FIGS. 7-11D so that the refrigerant composition has a desired set of properties.

Figure 12:
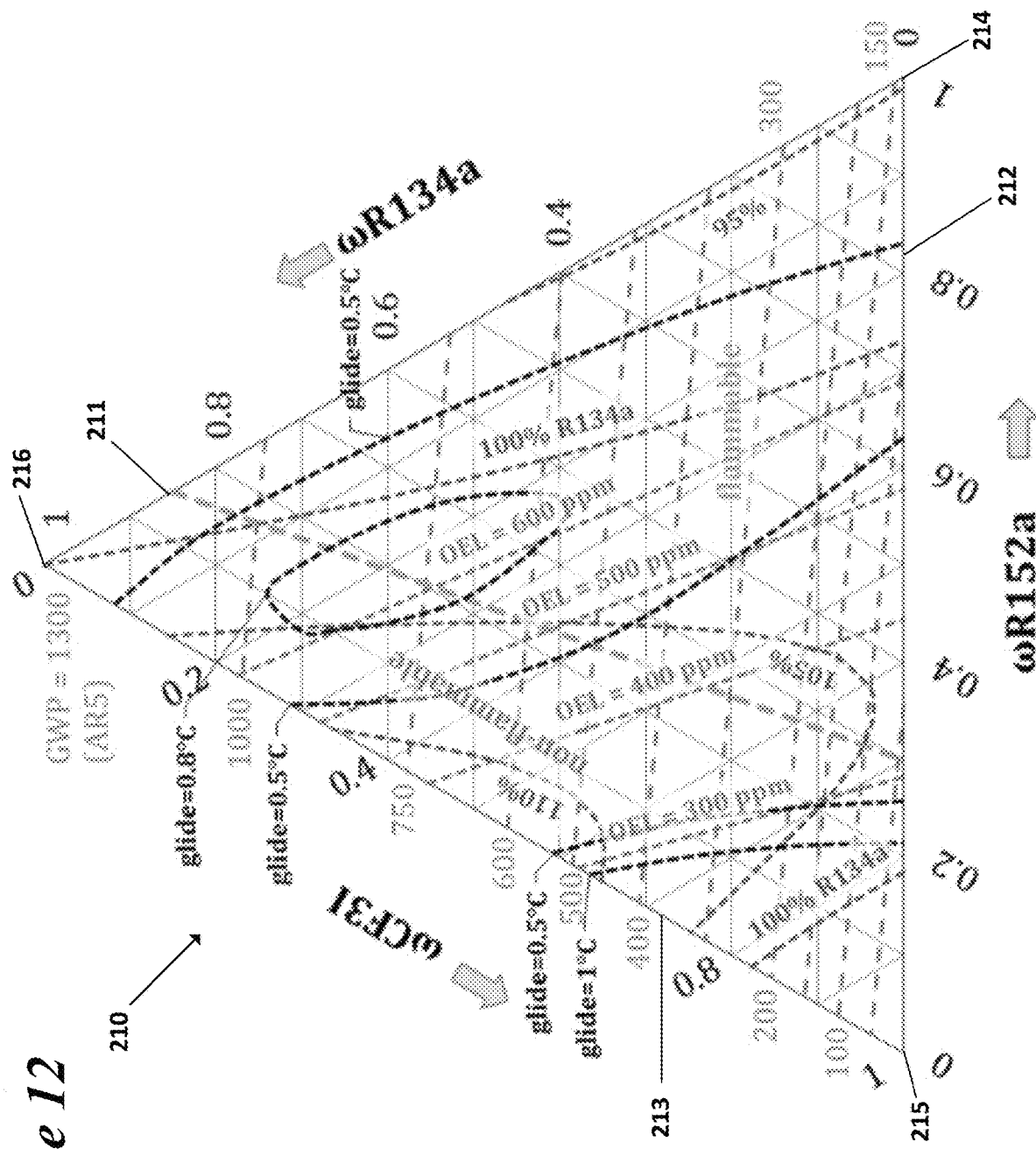
FIG. 12 illustrates a matrix of compositions of R152a, R134a, and CF$_3$I showing plots of GWP, flammability, temperature glide, capacity (relative to R134a), and OEL.

FIG. 12 illustrates a matrix 210 that was developed to show plots of GWP, flammability, temperature glide, capacity (relative to R134a), and OEL as a function of the concentration of R152a, R134a, and $CF_3I$. Each side 211, 212, 213 of the triangle corresponds to percentages (by weight) of R134a, R152a, or $CF_3I$. Each vertex 214, 215, 216 corresponds to composition of 100 wt % R152a, $CF_3I$, and R134a, respectively. Properties (e.g., GWP, capacity relative to R134a, flammability, temperature glide, OEL) of a refrigerant composition with weight percentages of the refrigerants R152a, R134a, and $CF_3I$ can be estimated using the matrix 210.

Properties of the compositions for the matrix 210 were estimated using a thermodynamic model. The boundary between flammable and non-flammable compositions is shown matrix 210 by the large dashed line. Flammable compositions are on the right side of the boundary and non-flammable compositions are on the left side of the boundary. The boundary is estimated based on the flammability characteristics of R152a, R134a, and $CF_3I$; the known flammability boundary of binary mixtures of R152a and R134a; the flammability of R152a relative to R1234yf; and the flame suppressant properties of $CF_3I$. OEL and GWP are based on the GWP and OEL of the individual components. The flammability boundary is estimated based on known characteristics of the individual components and binary mixtures of the individual components. Accordingly, the amount of each refrigerant in a composition along the flammability boundary may, for example, vary by about 5 percent in an embodiment. It should be appreciated the compositions and ranges shown and/or described may be updated based on further testing to confirm the location of the flammability boundary.

The OEL of the compositions in FIG. 12 are calculated using the methodology described in ASHRAE 34, in a similar manner as described above regarding FIG. 1. Accordingly, the lines of OELs shown in FIGS. 12-15 may be revised based on any changes to the OELs of the refrigerants.

Figure 13:
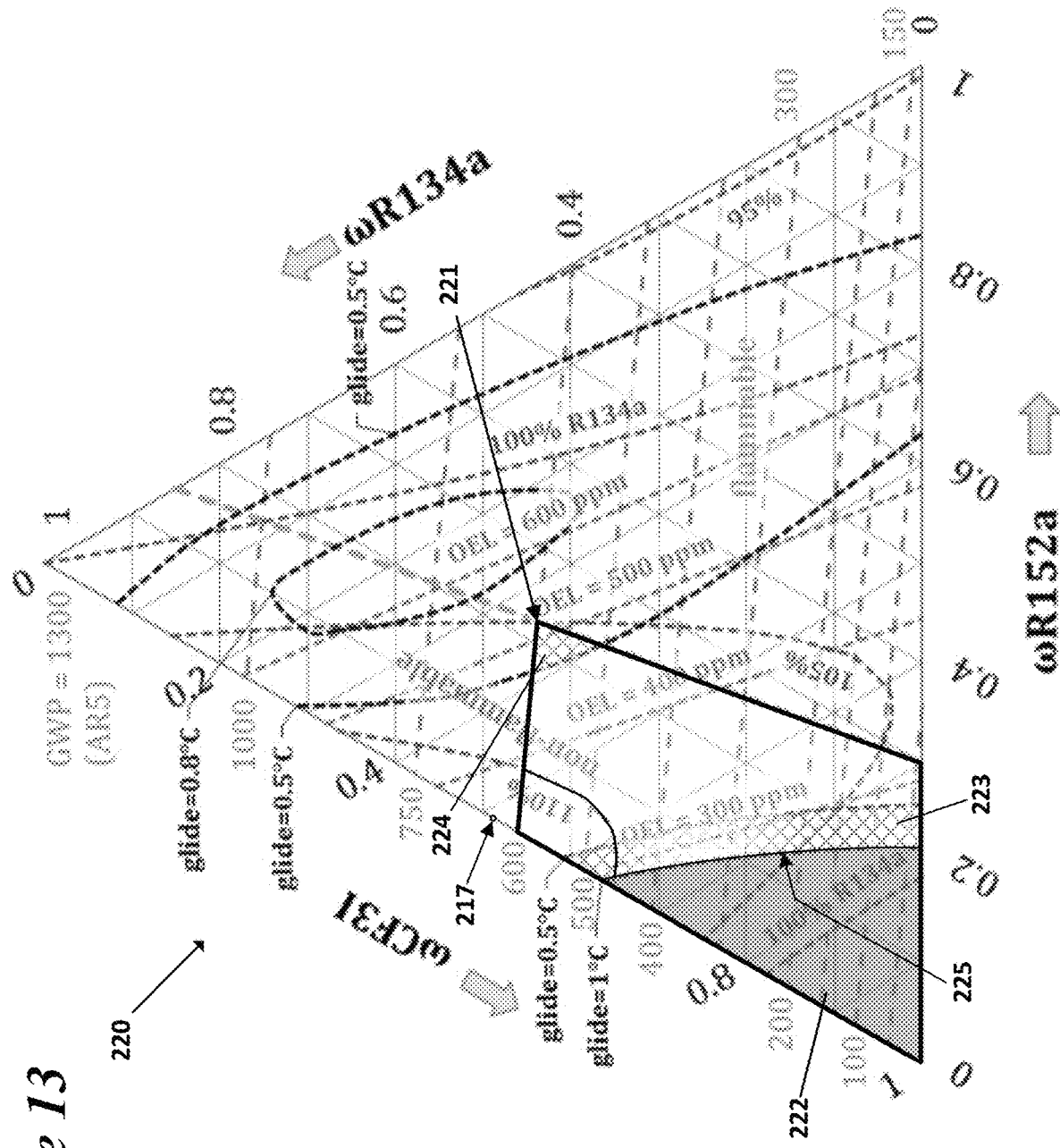
FIGS. 13-15 each illustrate a matrix based on the matrix of FIG. 12 that can be used to select a refrigerant composition with a desired set of properties in an embodiment.
Figure 14:
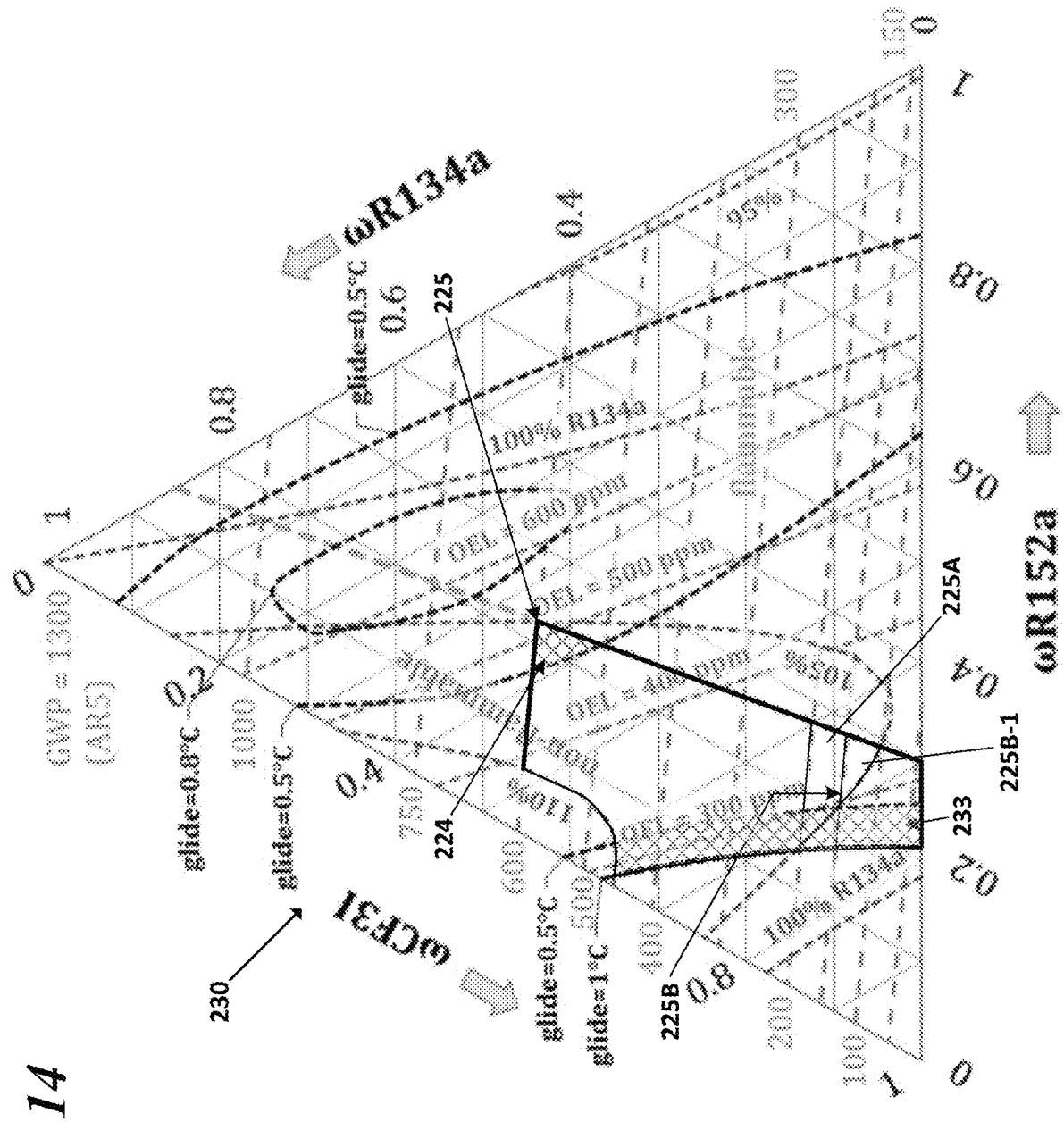
Figure 15:
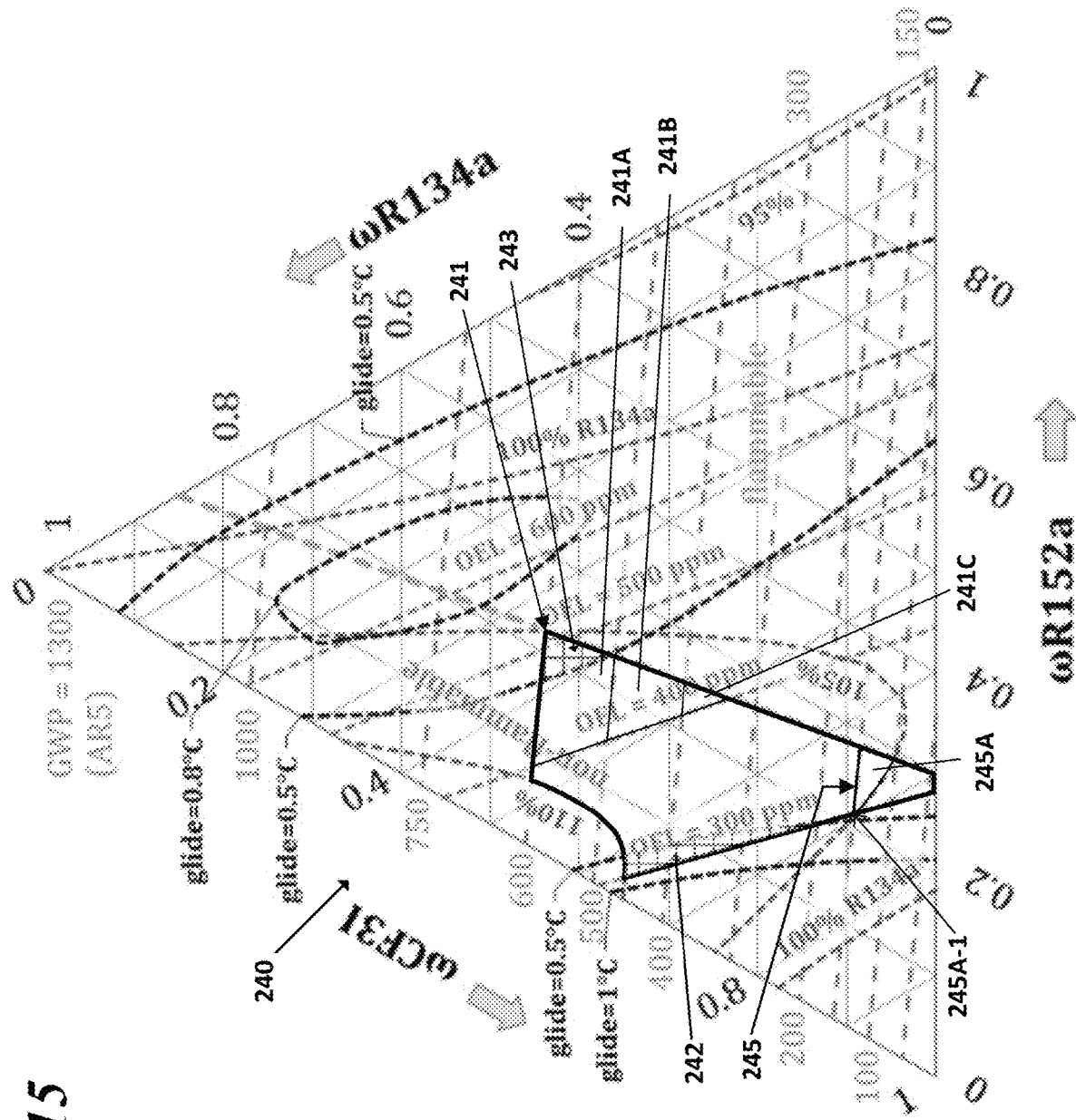

Each of FIGS. 13-15 illustrates a matrix 220, 230, 240 that is based on the matrix 210 of FIG. 12 and has the same sides and vertices as matrix 210. Each matrix 220, 230, 240 is the same as the matrix 210 of FIG. 12, except that ranges of refrigerant compositions are illustrated. As shown in FIG. 12, an increase in the weight percent of R134a (shown by side 211) in a composition also increases the GWP of the composition. As also shown by FIG. 12, weight percentage of $CF_3I$ in the composition has the largest impact on the composition's OEL of the composition. The capacity of a composition increases as it approaches a mixture 217 of at or about 51.5 wt % $CF_3I$ and at or about 48.5 wt % R134a.

In an embodiment, a desired set of properties of a useful refrigerant composition includes being non-flammable and having a GWP of less than 600. Based on these desired properties, a range of useful refrigerant compositions 221 of R152a, R134a, and $CF_3I$ is shown in the matrix 220 of FIG. 13. The useful refrigerant compositions 221 include at or about 30 wt %, or less than 30 wt % and greater than 0 wt % of R152a; at or about 46 wt %, or less than 46 wt % and greater than 0% of R134a; and at or about 33.9 wt %, or greater than 33.9 wt % and less than 100 wt % of $CF_3I$. In an embodiment, the useful composition 221 may include at or about 30 wt %, or less than 30 wt % and greater than 0 wt % of R152a; at or about 46 wt %, or less than 46 wt % and greater than 0% of R134a; and at or about 34 wt %, or greater than 34 wt % and less than 100 wt % of $CF_3I$.

FIG. 13 includes a shaded area 222 and hatched areas 223, 224. The shaded area illustrates compositions of the useful compositions 221 that have a temperature glide that is greater than 1° C. The hatched areas 223, 224 illustrate compositions of the useful compositions 221 that have a temperature glide that is at or about or less than 1.0° C. and greater than 0.5° C. In some embodiments, the set of desired properties includes a temperature glide that is at or about or less than 1° C. In such embodiments, the useful compositions 221 in FIG. 13 would include those compositions that are not within the shaded area 222. In some embodiments, the set of desired properties includes a temperature glide that is at or about or less than 0.5° C. In such embodiments, the useful compositions 221 in FIG. 13 would include those compositions that are not within the shaded area 222 or the hatched areas 223, 224.

In an embodiment, useful compositions 220 may include preferred compositions 225 as shown in FIGS. 13 and 14. The preferred compositions 225 are non-flammable, have a GWP of less than 600, a capacity at or about or less than 110% of the capacity of R134a, and a temperature glide of 1° C. or less. The preferred refrigerant compositions 225 include from at or about 1 wt % to at or about 30 wt % of R152a; at or about 46 wt %, or less than 46 wt % and greater than 0 wt % of R134a, and from at or about 33.9 wt % to at or about 78.6 wt % of $CF_3I$. In an embodiment, the preferred refrigerant compositions 225 include from at or about 1 wt % to at or about 30 wt % of R152a; at or about 46 wt %, or less than 46 wt % and greater than 0 wt % of R134a, and from at or about 34 wt % to at or about 79 wt % of $CF_3I$.

A desired property of the GWP being less than 600 may be different. In an embodiment, a composition having a GWP of less than 500 is desired. In an embodiment, a composition having a GWP of less than 400 is desired. In an embodiment, a composition having GWP of less than 300 is desired. In an embodiment, a composition having a GWP of less than 150 is desired.

In such embodiments, the useful compositions 221 shown in FIG. 13 and preferred compositions 225 shown in FIGS. 13 and 14 would include those compositions that have the desired GWP.

The set of desired properties may include a capacity relative to R134a. In an embodiment, a composition having a capacity at or about or greater than the capacity of R134a is desired. In an embodiment, a composition having a capacity at or about or greater than 105% of the capacity of R134a is desired. In an embodiment, a composition having a capacity that is from 100% to 110% of the capacity of R134a is desired. In an embodiment, a composition having a capacity that is from 100% to 105% is desired. In an embodiment, a composition having a capacity that is from 105% to 110% of the capacity of R134a is desired. In such embodiments, the useful compositions 221 shown in FIG. 13 and the preferred compositions 225 shown in FIGS. 13 and 14 would include those compositions that have the desired capacity.

Specific compositions within the range of preferred compositions 225 may be desired based on the specific properties desired in an embodiment. For example, matrix 230 in FIG. 14 identifies compositions 225A-225B of preferred composition 225 that have properties that may be desired in a particular embodiment. Compositions 225A-225B are exemplary.

In an embodiment, compositions 225A may be selected as they have a GWP of less than 200 and a capacity that is at or about or greater than the 105% of the capacity of R134a. In an embodiment, compositions 225B may be selected as they a GWP of less than 150. Of compositions 225B, compositions 225B-1 may be selected in an embodiment as they have a capacity that is at or about or greater than 105% of the capacity of R134a.

FIG. 14 includes hatched areas 224, 233. The hatched areas 224, 233 illustrate compositions of the preferred compositions 225 that have a temperature glide greater than 0.5° C. In some embodiments, a desired set of properties includes a temperature glide at or about or less than 0.5° C. In such embodiments, the preferred compositions 225 shown in FIG. 14 would not include those compositions within the hatched areas 224, 233. Accordingly, in such embodiments, the compositions 225A-225D shown in FIG. 14 would include those compositions that are not within the hatched area 233.

In an embodiment, a desired set of properties of a refrigerant composition includes being non-flammable, having a GWP of less than 600, and having an OEL of 300 ppm or greater. Based on these desired properties, the matrix 240 of FIG. 15 shows a range of useful refrigerant compositions 241 of R152a, R134a, and $CF_3I$. The useful refrigerant compositions 241 include from at or about 2 wt % to at or about 30 wt % R152a; at or about 46 wt %, or less than 46 wt % and greater than 0 wt % of R134a, and from at or about 33.9 wt % to at or about 74.2 wt % of $CF_3I$. In an embodiment, the useful refrigerant compositions may include at or about 2 wt % to at or about 30 wt % R152a; at or about 46 wt %, or less than 46 wt % and greater than 0 wt % of R134a, and from at or about 34 wt % to at or about 75 wt % of $CF_3I$.

As similarly discussed above, the lines for OEL may be revised upon a determination that the OEL of $CF_3I$ is greater than described. It should be appreciated that the ranges shown and/or described may be similarly revised. For example, maximum amount in the range of $CF_3I$ may be greater if the OEL is determined to be larger value than 165 ppm.

The desired property of the GWP being less than 600 may be different. In an embodiment, a composition having a GWP of less than 500 is desired. In an embodiment, a composition having a GWP of less than 400 is desired. In an embodiment, a composition having a GWP of less than 300 is desired. In an embodiment, a composition having a GWP of less than 150 is desired. In such embodiments, the useful compositions 241 in FIG. 15 would include those compositions that have the desired GWP.

The set of desired properties may include a capacity relative to R134a. In an embodiment, a composition having a capacity at or about or greater than the 105% of the capacity of R134a may be desired. In an embodiment, a composition having a capacity from 100% to 110% of the capacity of R134a may be desired. In an embodiment, a composition having a capacity that is from 100% to 105% of the capacity of R134a may be desired. In an embodiment, a composition having a capacity that is from 105% to 110% of the capacity of R134a may be desired. In such embodiments, the useful compositions 241 in FIG. 15 would include those compositions that have the desired capacity.

Specific compositions within the range of useful compositions 241 of matrix 240 may be desired based on the specific properties desired in an embodiment. For example, matrix 240 of FIG. 15 identifies ranges of compositions 241A-241C and 245 that have properties that may be desired in a particular embodiment. Compositions 241A-241C and 245 are exemplary.

In an embodiment, compositions 241A, 241B, and 241C may be selected as they have an OEL that is at or about or greater than 400 ppm. In an embodiment, compositions 241B and 241C may be selected as they have an OEL at or about or greater than 400 ppm and a GWP less than 500. In an embodiment, compositions 241C may be selected as they have an OEL of 400 ppm or greater and a GWP of less than 400. Compositions 241A, 241B, and 241C would be ASHRAE class A refrigerants as they have an OEL of 400 ppm or greater.

In an embodiment, compositions 245 of useful compositions 241 may be preferred as they have a GWP of less than 150. Compositions 245 include from at or about 21.5 wt % to at or about 30 wt % of R152a; at or about 49 wt %, or less than 49 wt % and greater than 0 wt % of R134a; and from at or about 63.4 wt % to at or about 78.6 wt % of $CF_3I$. In an embodiment, compositions 245 may include from at or about 21 wt % to at or about 30 wt % of R152a; at or about 49 wt %, or less than 49 wt % and greater than 0 wt % of R134a; and from at or about 63 wt % to at or about 79 wt % of $CF_3I$. Of compositions 245, compositions 245A may be selected in an embodiment as they have a capacity that is at least 105% of the capacity of R134a. Of compositions 245a, composition 245A-1 may be selected in an embodiment as it provides the greatest capacity. Composition 245A-1 is at or about 21.5 wt % R152a, at or about 9 wt % R134a, and at or about 69.5 wt % $CF_3I$ by weight. Table 4 below shows various properties of composition 245A-1.

TABLE 4

| Properties of Composition 245A-1 | |
|---|---|
| Capacity* | 105% |
| Coefficient of Performance* | 101% |
| Change in Compressor Discharge Temperature* | +12° F. |
| Mass Flow Rate* | 134% |
| Density (Liquid)* | 123% |
| Temperature Glide | 0.8° F. |
| Compressor Pressure Ratio (Discharge Pressure:Suction Pressure)* | 92% |

*Property is relative to R134a (100% being equal to R134a).

FIG. 15 includes hatched areas 242, 243. The hatched areas 242, 243 illustrate compositions of the useful compositions 241 that have a temperature glide that is greater than 0.5° C. In some embodiment, the set of desired properties includes a temperature glide of 0.5° C. or less. In such embodiments, the useful compositions 241 shown in FIG. 15 would include those compositions that are not within the hatched areas 242, 243. Similarly, in such embodiments, compositions 241A would include those compositions that are not within the hatched area 243.

Figure 16A:
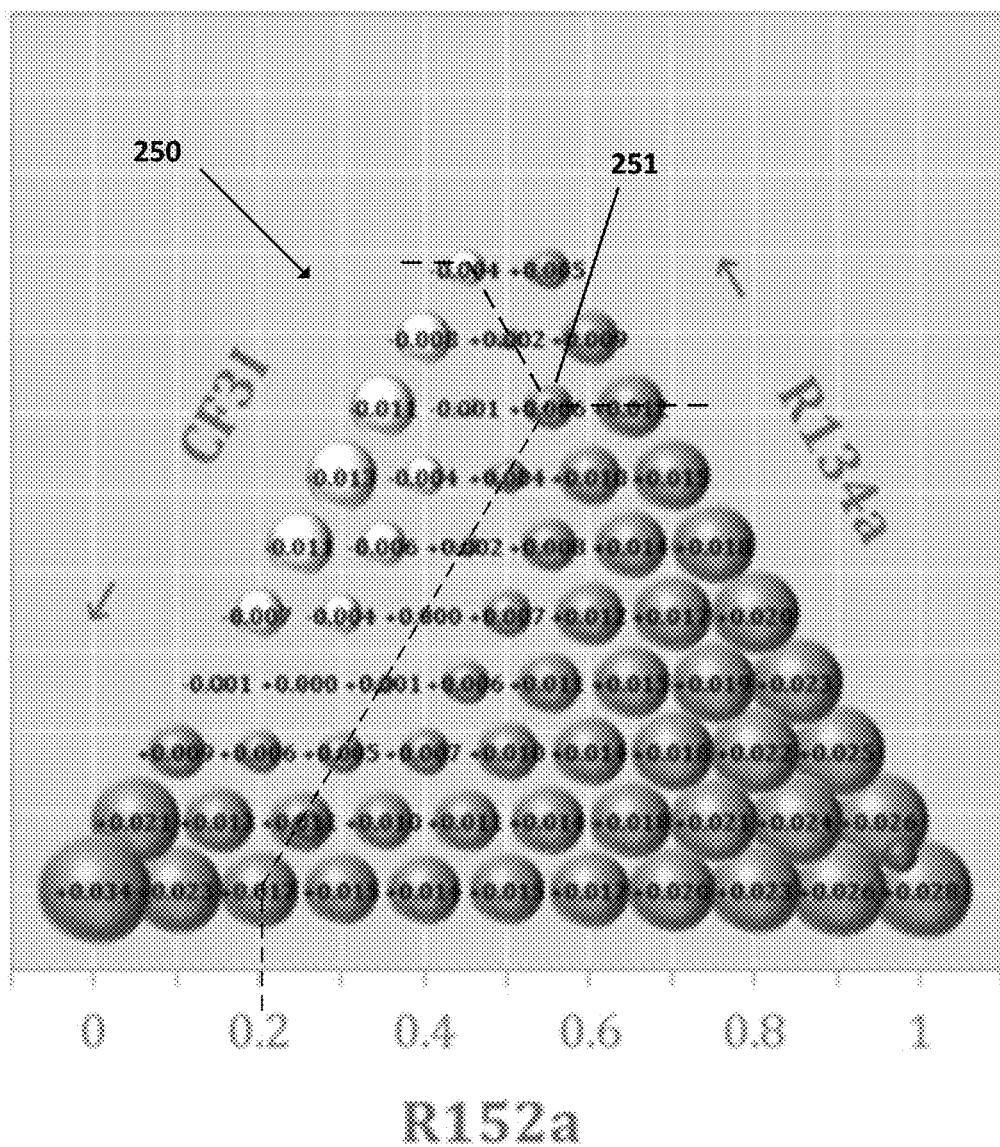
FIGS. 16A-16D each illustrate a matrix of a thermodynamic property of compositions of R152a, R134a, and CF$_3$I.
Figure 16B:
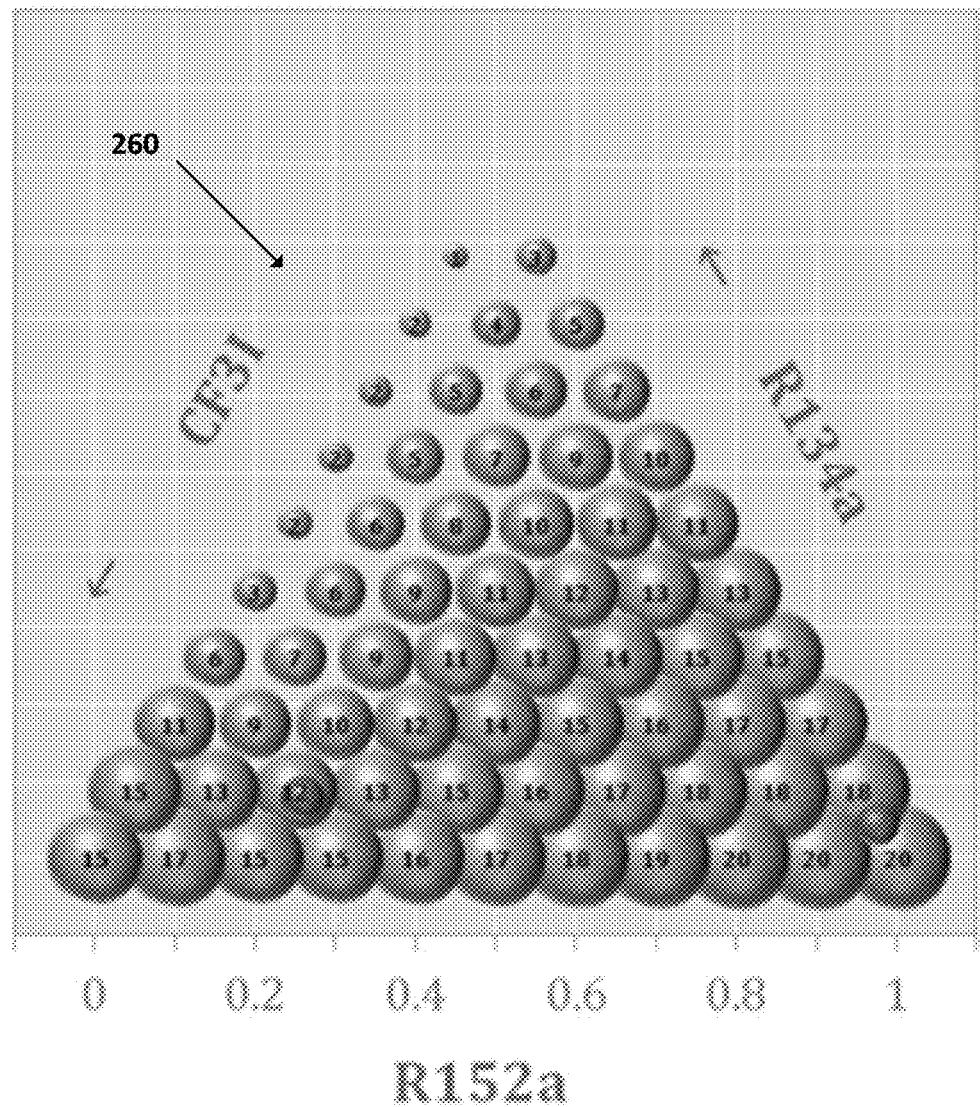
Figure 16C:
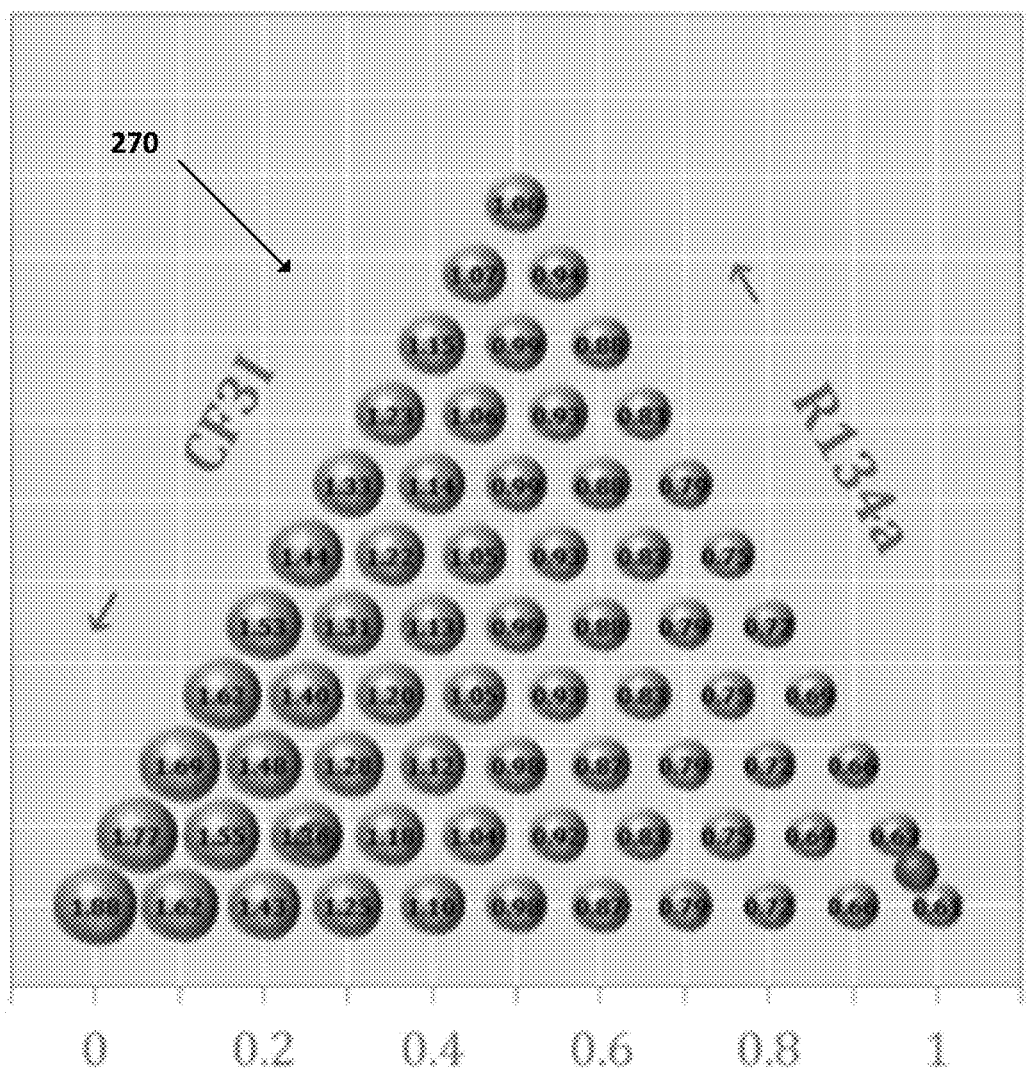
Figure 16D:
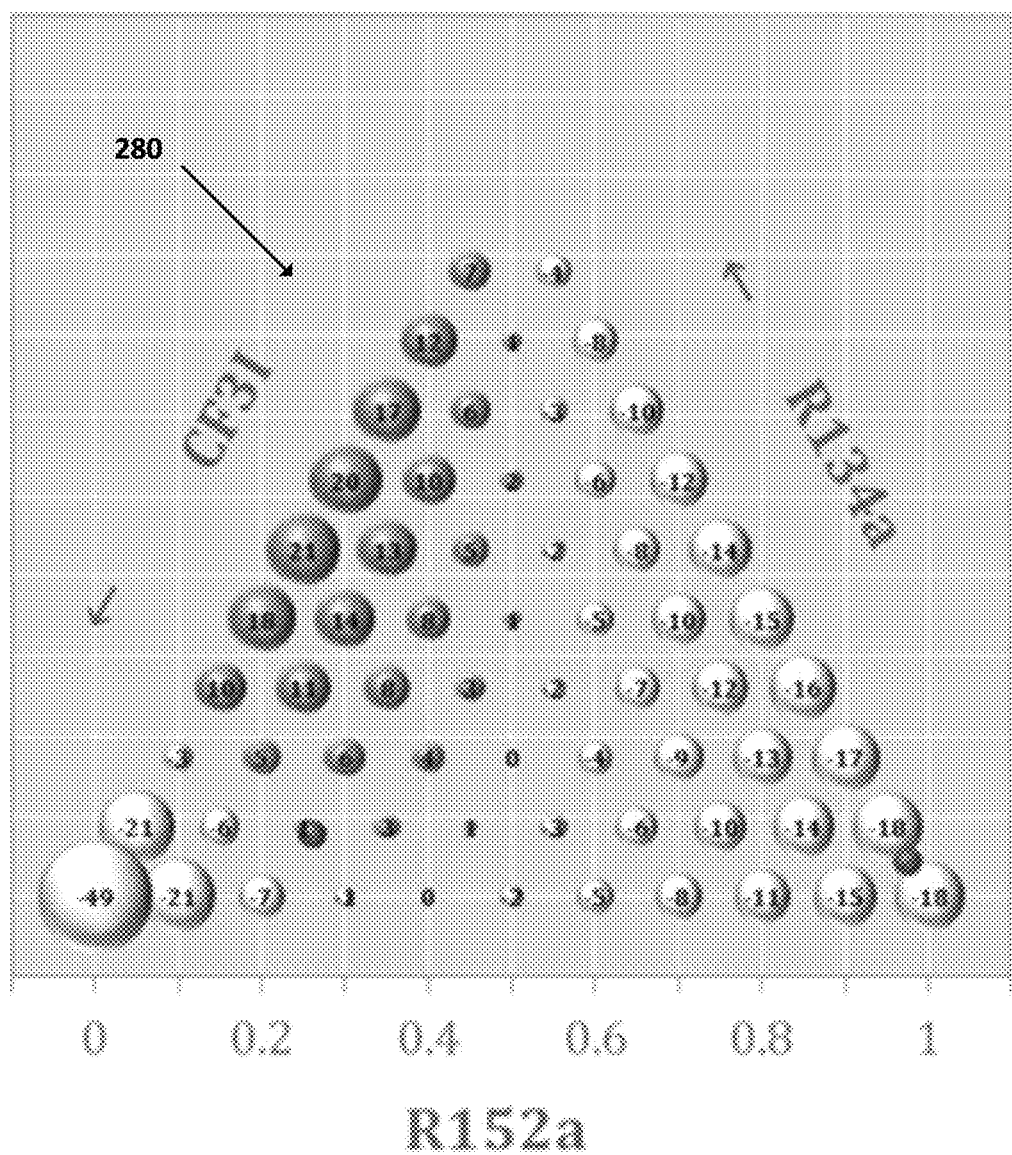

Each of FIGS. 16A-16D illustrates a matrix 250, 260, 270, 280 of a thermodynamic property for compositions of R152a, R134a, and $CF_3I$. Compositions in each matrix 250, 260, 270, 280 are calculated similarly to the matrixes 210, 220, 230, 240 in FIGS. 12-15. Accordingly, the axes for R134a are parallel axis to the side for R152a (e.g., horizontal), the axes for R152a are parallel to the side for $CF_3I$, and the axes for $CF_3I$ are parallel to axis of side for R134a. Each matrix 250, 260, 270, 280 shows values of compositions at each 10 wt % increments of R152a, R134a, and $CF_3I$ (except for 100 wt % R134a in FIGS. 16A, 16B, and 16D). The values for 100 wt % R134a in FIGS. 16A, 16B, and 16D are not shown as they have values of at or about zero. For example, composition 251 in FIG. 16A corresponds to a composition of 20 wt % R152a, 70 wt % R134a, and 10 wt % $CF_3I$.

FIG. 16A illustrates a matrix 250 of coefficients of performance (relative to R134a) for compositions of R152a, R134a, and $CF_3I$. FIG. 16B illustrates a matrix 260 of compressor discharge temperatures in Fahrenheit (relative to R134a) for compositions of R152a, R134a, and $CF_3I$. FIG. 16C illustrates a matrix 270 of mass flow rates (relative to R134a) for compositions of R152a, R134a, and $CF_3I$. FIG. 16D illustrates a matrix 280 of operating pressures in PSI (relative to R134a) for compositions of R152a, R134a, and $CF_3I$.

Performance of a refrigerant composition may be based on one or more of a coefficient of performance, compressor discharge temperature, mass flow rate, and operating pressure. In an embodiment, a composition having a specific coefficient of performance (relative to R134a), compressor discharge temperature (relative to R134a), mass flow rate (relative to R134a), and/or operating pressure (relative to R134a) may be desired. In an embodiment, a composition that has a coefficient of performance of greater than 97% relative to R134a may be preferred. In an embodiment, a composition that results in a change in the compressor change discharge temperature, relative to R134a, that is at or about or less than 20° F. may be preferred. In an embodiment, a composition that has results in a mass flow rate of less than 1.5 times greater than R134a may be desired. In an embodiment, a composition that has results in a mass flow rate of less than 1.2 times greater than R134a may be desired. In an embodiment, a composition that has results in a mass flow rate of less than 1.1 times greater than R134a may be desired. In an embodiment, a composition that results in an operating pressure of about at or about R134a may be desired. In an embodiment, composition that results in a change in the condenser operating pressure, relative to R134a, of less than less than 20 psid may be desired. In an embodiment, a method of making a refrigerant composition utilizes one or more of the matrices of FIGS. 12-15D so that the refrigerant composition has a desired set of properties.

It should be noted that the described refrigerant compositions may include one or more additional components. For example, additional components may be impurities, lubricant, and refrigeration system additives, tracers, and an ultraviolet ("UV") dye and solubilizing agent. Typically, a refrigerant composition may include less than 1 wt % of these additional components. Some refrigerant compositions, depending upon their components, may have less than about 5 wt % of some additives, such as lubricants, in a particular location or piece of equipment in a heat transfer circuit. In an embodiment, the refrigerant compositions described would have the ranges described above and the additive would be added in addition to the composition.

In an embodiment, a refrigerant composition may include one or more impurities. An impurity may be, for example, a refrigerant or refrigerant blend used in an HVACR system. An impurity may be, for example, refrigeration lubricants, particulates (e.g., metal particles, metal salts, elastomer particles) from equipment of the HVACR system, and other contaminant that may adversely affect a working fluid.

In an embodiment, a refrigerant composition may include one or more lubricants that are compatible with the refrigerant composition. For example, a lubricant may be a lubricant that is designed for use with HFCs and HFOs and is compatible with refrigerant compositions described herein. Further, the lubricant may be based on the HVACR system that will be using the refrigerant composition. For example, a lubricant may be selected based on the equipment of the HVACR system (e.g., compressor 2 in FIG. 1) and the environment in which the refrigerant may be exposed to. A refrigerant composition may include those lubricants known as "mineral oils" and/or those lubricants known as "synthetic oils" in the field of compression refrigeration lubrication.

In an embodiment, a refrigerant composition may include one or more refrigeration system additives to, for example, enhance lubricity and/or system stability. A refrigeration system additive may be, for example, an anti-wear agent, an extreme pressure lubricant, a corrosion or oxidation inhibitor, a metal surface deactivator, a stabilizer (e.g., antioxidant, free radial scavenger, water scavenger), a foaming and antifoam control agent, or a leak detectant.

In an embodiment, a refrigerant composition may include one or more tracers. The tracers may be used in detecting if any dilution, contamination, or other alteration of the working fluid (which includes the refrigerant composition) has occurred. In an embodiment, a refrigerant composition may include one or more UV dyes. The UV dye may allow a person (e.g., operator, field technician) to observe leaks in or near the HVACR system. Due to the low solubility of some UV dyes in some refrigerant compositions, a solubilizing agent may be included with the UV dye.

In an embodiment, a refrigerant composition in a HVACR system may be retrofitted. The refrigerant composition is retrofitted to have a desired set of properties. The refrigerant composition is retrofitted so as to result in a retrofitted refrigerant composition that includes a first refrigerant, a second refrigerant, and a third refrigerant. The first refrigerant is R134a, the second refrigerant is $CF_3I$, and the third refrigerant is either R152a, R1234yf, or R1234ze(E). For example, the refrigerant composition to be retrofitted in an embodiment may include R134a; a mixture of R152a and $CF_3I$; or a mixture of a HFO (R1234yf or R1234ze(E)) and $CF_3I$.

In an embodiment, an HVACR utilizes a refrigerant composition including R134a, and a method of retrofitting the refrigerant composition of the HVACR includes adding an amount of a low GWP HFC or a HFO and adding an amount of a $CF_3I$. The amount of low GWP HFC or HFO added and the amount of $CF_3I$ added are amounts that result in a retrofitted refrigerant composition with the desired set of properties.

In an embodiment where the HFO being added is R1234yf, retrofitted compositions with the desired set of properties can be determined using the matrices in FIGS. 2-6D. In an embodiment where the HFO being added is R1234ze(E), retrofitted compositions that would have the desired set of properties can be determined using the matrices in FIGS. 7-11D. In an embodiment where R152a is being added as the low GWP HFC, retrofitted compositions that would have the desired set of properties can be determined using the matrices in FIGS. 12-16D.

In an embodiment, an HVACR utilizes a refrigerant composition that is a mixture of a low GWP HFC and $CF_3I$ or a mixture of a HFO and $CF_3I$, and a method of retrofitting the refrigerant composition of the HVACR includes adding an amount of R134a. The amount of R134a added is an amount that results in a retrofitted refrigerant composition that has the desired properties.

In an embodiment where the HVACR utilizes a refrigerant composition of R1234yf and $CF_3I$, retrofitted compositions that have the desired set of properties can be determined using the matrices in FIGS. 2-6D. In an embodiment where the HVACR utilizes a refrigerant composition that is a mixture of R1234ze(E) and $CF_3I$, retrofitted compositions that would have the desired set of properties can be determined using the matrices in FIGS. 7-11D. In an embodiment where the HVACR utilizes a refrigerant composition that is a mixture of R152a and $CF_3I$, the retrofitted composition that would have the desired set of properties can be determined using the matrices in FIGS. 12-16D.

In an embodiment, a method for making a refrigerant composition for a HVACR system includes selecting an amount of a first refrigerant, selecting an amount of $CF_3I$, selecting an amount of R134a, and mixing the amounts of the first refrigerant, the $CF_3I$, and the R134a. The amounts of the first refrigerant, the $CF_3I$, and the R134a may be selected so that the refrigerant composition has one or more desired properties. A desired property may be, for example, flammability, GWP, OEL, temperature glide, a coefficient of performance, compressor discharge temperature, mass flow rate, or operating pressure.

The first refrigerant is either a low GWP HFC or a HFO. In an embodiment, the HFO is R1234yf. In such an embodiment, one or more matrixes in FIGS. 2-6D are utilized so that the refrigerant composition has the one or more desired properties. In an embodiment, the low GWP HFC is R152a. In such an embodiment, one or more matrixes in FIGS. 12-16D are utilized so that the refrigerant composition has the one or more desired properties. In an embodiment, the HFO is R1234ze(E). In such an embodiment, one or more matrixes in FIGS. 7-11D are utilized so that the refrigerant composition has the one or more desired properties.

In an embodiment, the method may include selecting an appropriate amount of one or more additional components (e.g., lubricant, and refrigeration system additives, tracers, an ultraviolet dye, a solubilizing agent).

In an embodiment, the amount of the first refrigerant is selected so that the refrigerant composition has a GWP of less than 600. In an embodiment, the amount of $CF_3I$ is selected so that the refrigerant composition is non-flammable. As $CF_3I$ has a low GWP, selecting the amount of the first refrigerant may also consider the amount of the $CF_3I$ selected in an embodiment. The amount of the R134a is selected to address the capacity of the refrigerant composition in an embodiment.

Aspects:

Any of aspects 1-13 can be combined with any of aspects 14-27 and any of aspects 14-17 can be combined with any of aspects 18-26.

Aspect 1. A non-flammable refrigerant composition for a HVACR system, the non-flammable refrigerant composition comprising:
a first refrigerant that is one of R152a refrigerant, R1234yf refrigerant, or R1234ze(E) refrigerant;
$CF_3I$; and
R134a refrigerant, wherein
the refrigerant composition has a GWP of less than 600.

Aspect 2. The non-flammable refrigerant composition of aspect 1, wherein the GWP of the non-flammable refrigerant is less than 150.

Aspect 3. The non-flammable refrigerant composition of aspect 1 or 2, wherein the non-flammable refrigerant composition has a temperature glide that is about or less than 1.0° C.

Aspect 4. The non-flammable refrigerant composition of any of aspects 1-3, wherein the non-flammable refrigerant composition has an occupational exposure limit of 300 parts per million or greater.

Aspect 5. The non-flammable refrigerant composition of any of aspects 1-4, wherein the first refrigerant is R1234yf refrigerant.

Aspect 6. The non-flammable refrigerant composition of any of aspects 1-5, wherein the non-flammable refrigerant composition has a capacity that is about or greater than 90% of a capacity of R134a refrigerant alone.

Aspect 7. The non-flammable refrigerant composition of any of aspects 1-6, wherein
the 1234yf refrigerant is from about 2% to about 68% by weight of the non-flammable refrigerant composition,
the $CF_3I$ is about or less than 63.7% by weight of the non-flammable refrigerant composition, and
the R134a refrigerant is from about 9.8% to about 46% by weight of the non-flammable refrigerant composition.

Aspect 8. The non-flammable refrigerant composition of any of aspects 1-6, wherein
the 1234yf refrigerant is from about 13.5% to about 85% by weight of the non-flammable refrigerant composition,
the $CF_3I$ is less than 40.5% by weight of the non-flammable refrigerant composition, and
the R134a refrigerant is about or less than 46% by weight of the non-flammable refrigerant composition.

Aspect 9. The non-flammable refrigerant composition of any of aspects 1-4, wherein the first refrigerant is the R1234ze(E) refrigerant.

Aspect 10. The non-flammable refrigerant composition of any of aspects 1-4 or 9, wherein the non-flammable refrigerant composition has a capacity that is about or greater than a capacity of R134a refrigerant alone.

Aspect 11. The non-flammable refrigerant composition of any of aspects 1-4, 9, or 10, wherein
the R1234ze(E) refrigerant is about or less than 54.8% by weight of the non-flammable refrigerant composition,
the $CF_3I$ is from about 4.5% to about 91.1% by weight of the non-flammable refrigerant composition, and
the R134a refrigerant is from about 1.9% to about 46% by weight of the non-flammable refrigerant composition.

Aspect 12. The non-flammable refrigerant composition of any of aspects 1-4, 9, or 10, wherein
the R1234ze(E) refrigerant is from about 10% to about 90% by weight of the non-flammable refrigerant composition,
the $CF_3I$ is about or less than 43.5% by weight of the non-flammable refrigerant composition, and
the R134a refrigerant is about or less than 46% by weight of the non-flammable refrigerant composition.

Aspect 13. The non-flammable refrigerant composition of any of aspects 1-4, wherein
the first refrigerant is a R152a refrigerant, the R152a refrigerant being from about 1% to about 30% by weight of the non-flammable refrigerant composition,
the $CF_3I$ is from about 33.9% to about 78.6% by weight of the non-flammable refrigerant composition, and
the R134a refrigerant is about or less than 46% by weight of the non-flammable refrigerant composition.

Aspect 14. A method of making a refrigerant composition for a HVACR system, the method including:
mixing an amount of a first refrigerant, an amount of a second refrigerant, and an amount of a third refrigerant, wherein
the first refrigerant is one of R152a refrigerant, R1234yf refrigerant, or R1234ze(E) refrigerant, the second refrigerant is $CF_3I$, and the third refrigerant is R134a refrigerant, and
the refrigerant composition is nonflammable and has a GWP of less than 600.

Aspect 15. The method of aspect 14, wherein the amount of the first refrigerant is selected so that the GWP of the refrigerant composition is less than 150.

Aspect 16. The method of either of aspects 14 or 15, wherein the refrigerant composition has a capacity about or greater than 90% of a capacity of R134a refrigerant alone.

Aspect 17. The method of any one of aspects 14-16, wherein the refrigerant composition has a capacity about or greater than a capacity of R134a refrigerant alone.

Aspect 18. A method of retrofitting a refrigerant composition in an HVACR system, comprising:
adding one or more compounds to the refrigerant composition resulting in a retrofitted refrigerant composition that is either:
a first retrofitted refrigerant composition R152a refrigerant, $CF_3I$, and R134a refrigerant, or
a second retrofitted refrigerant composition comprising a hydrofluoroolefin (HFO) refrigerant, the $CF_3I$, and the R134a refrigerant, the HFO refrigerant being R1234yf or R1234ze(E) wherein
when the retrofitted refrigerant composition is the first retrofitted refrigerant composition, and the refrigerant composition comprises the R134a refrigerant, adding one or more compounds includes:
adding an amount of the $CF_3I$ so that the retrofitted refrigerant composition is non-flammable, and
adding an amount of the R152a refrigerant so that a GWP of the retrofitted refrigerant composition is less than 600, or
when the retrofitted refrigerant composition is the first retrofitted refrigerant composition, and the refrigerant composition comprises the R152a refrigerant and the $CF_3I$, adding one or more compounds includes:
adding an amount of the R134a refrigerant to address capacity, the amount of the R134a refrigerant being selected so that a GWP of the retrofitted refrigerant composition is less than 600, or
when the retrofitted refrigerant composition is the second retrofitted refrigerant composition, and the refrigerant composition comprises the R134a refrigerant, adding one or more compounds includes:
adding an amount of the $CF_3I$ to the refrigerant composition so that the retrofitted refrigerant composition is non-flammable, and
adding an amount of the R152a refrigerant to the refrigerant composition so that a GWP of the retrofitted refrigerant composition is less than 600, or
when the retrofitted refrigerant composition is the second retrofitted refrigerant composition, and the refrigerant composition comprises the R152a refrigerant and the $CF_3I$, adding one or more compounds includes:
Adding an amount of the R134a refrigerant to address capacity, the amount of the R134a being selected so that a GWP of the retrofitted refrigerant composition is less than 600.

Aspect 19. The method of aspect 18, wherein the retrofitted refrigerant composition comprises the R152a refrigerant, the $CF_3I$, and the R134a refrigerant.

Aspect 20. The method of aspect 18, wherein the retrofitted refrigerant composition comprises the HFO refrigerant, the $CF_3I$, and the R134a refrigerant.

Aspect 21. The method of either of aspects 18 or 20, wherein HFO refrigerant is the R1234yf refrigerant.

Aspect 22. The method of either of aspects 18 or 20, wherein HFO refrigerant is the R1234ze(E) refrigerant.

Aspect 23. The method of any one of the aspects 18-22, wherein the retrofitted refrigerant composition has a capacity of that is about or greater than 90% of a capacity of R134a refrigerant alone.

Aspect 24. The method of any one of the aspects 18-23, wherein the retrofitted refrigerant composition has a capacity that is about or greater than a capacity of R134a refrigerant alone.

Aspect 25. The method of any one of the aspects 18-24, wherein a temperature glide of the retrofitted refrigerant composition is that is about or less than 1° C.

Aspect 26. The method of one of aspects 18-25, wherein the GWP of the retrofitted refrigerant composition is less than 150.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A non-flammable refrigerant composition for a HVACR system, the non-flammable refrigerant composition comprising:
from about 2 wt % to about 68 wt % of R1234yf refrigerant;
about 63.7 wt %, or greater than 0 wt % and less than 63.7 wt % of $CF_3I$; and
from about 9.8 wt % to about 46 wt % of R134a refrigerant, wherein
the non-flammable refrigerant composition has a GWP of less than 600 and a capacity that is equal to or greater than a capacity of R134a refrigerant alone.

2. The non-flammable refrigerant composition of claim 1, wherein the GWP of the non-flammable refrigerant is less than 150.

3. The non-flammable refrigerant composition of claim 1, wherein the non-flammable refrigerant composition has a temperature glide that is equal to or less than 1.0° C.

4. A non-flammable refrigerant composition for a HVACR system, the non-flammable refrigerant composition comprising:
about 54.8 wt %, or greater than 0 wt % and less than 54.8 wt % of R1234ze(E) refrigerant;
from about 4.5 wt % to about 91 wt % of $CF_3I$; and
from about 1.9 wt % to about 46 wt % of R134a refrigerant, wherein
the non-flammable refrigerant composition has a GWP of less than 600 and a capacity that is equal to or greater than 90% of a capacity of R134a refrigerant alone.

5. A non-flammable refrigerant composition for a HVACR system, the non-flammable refrigerant composition comprising:
R152a refrigerant from about 1% to about 30% by weight of the non-flammable refrigerant composition;
$CF_3I$ from about 33.9% to about 78.6% by weight of the non-flammable refrigerant composition; and
R134a refrigerant being about 46% by weight or less than 46% by weight of the non-flammable refrigerant composition, wherein
the non-flammable refrigerant composition has a GWP of less than 600, a capacity that is equal to or greater than 90% of a capacity of R134a refrigerant alone, and a temperature glide that is equal to or less than 1.0° C.

6. A method of making a refrigerant composition for a HVACR system, the method comprising:
mixing an amount of a first refrigerant, an amount of $CF_3I$, and an amount of R134a refrigerant, wherein the first refrigerant is one of:
R152a refrigerant, such that the refrigerant composition includes from about 1 wt % to about 30 wt % of the R152a refrigerant from about 33.9 wt % to about 78.6 wt % of the $CF_3I$; and about 46 wt %, or less than 46 wt % and greater than 0 wt % of the R134a refrigerant,
R1234yf refrigerant, such that the refrigerant composition includes from about 2 wt % to about 68 wt % of the R1234yf refrigerant about 63.7 wt %, or greater than 0 wt % and less than 63.7 wt % of the $CF_3I$; and from about 9.8 wt % to about 46 wt % of the R134a refrigerant, or
R1234ze(E) refrigerant, such that the refrigerant composition includes about 54.8 wt %, or greater than 0 wt % and less than 54.8 wt % of the R1234ze(E) refrigerant; from about 4.5 wt % to about 91 wt % of $CF_3I$; and from about 1.9 wt % to about 46 wt % of the R134a refrigerant,
the refrigerant composition is non-flammable and has a GWP of less than 600 and a capacity that is equal to or greater than 90% of a capacity of R134a refrigerant alone.

7. The method of claim 6, wherein the GWP of the refrigerant composition is less than 150.

8. A method of retrofitting a refrigerant composition in an HVACR system, comprising:
adding one or more compounds to the refrigerant composition resulting in a retrofitted refrigerant composition that is one of:
a first retrofitted refrigerant composition including: from about 1 wt % to about 30 wt % of R152a refrigerant; from about 33.9 wt % to about 78.6 wt % of $CF_3I$; and about 46 wt %, or greater than 0 wt % and less than 46 wt % of R134a refrigerant, or
a second retrofitted refrigerant composition including: from about 2 wt % to about 68 wt % of R1234yf refrigerant; about 63.7 wt %, or greater than 0 wt % and less than 63.7 wt % of the $CF_3I$; and from about 9.8 wt % to about 46 wt % of the R134a refrigerant, or
a third retrofitted refrigerant composition including: about 54.8 wt %, or greater than 0 wt % and less than 54.8 wt % of R1234ze(E); from about 4.5 wt % to about 91 wt % of the $CF_3I$; and about 1.9 wt % to about 46 wt % of the R134 refrigerant, wherein
when the retrofitted refrigerant composition is the first retrofitted refrigerant composition, and the refrigerant composition including the R134a refrigerant, adding one or more compounds includes:
adding an amount of the $CF_3I$ so that the retrofitted refrigerant composition is non-flammable, and
adding an amount of the R152a refrigerant so that a GWP of the retrofitted refrigerant composition is less than 600, or
when the retrofitted refrigerant composition is the first retrofitted refrigerant composition, and the refrigerant composition including the R152a refrigerant and the $CF_3I$, adding one or more compounds includes:
adding an amount of the R134a refrigerant to address capacity, the amount of the R134a refrigerant being selected so that a GWP of the retrofitted refrigerant composition is less than 600, or
when the retrofitted refrigerant composition is the second retrofitted refrigerant composition or the third retrofitted refrigerant composition, and the refrigerant composition including the R134a refrigerant, adding one or more compounds includes:
adding an amount of the $CF_3I$ to the refrigerant composition so that the retrofitted refrigerant composition is non-flammable, and
adding an amount of the R1234yf refrigerant or the R1234ze(E) refrigerant to the refrigerant composition so that a GWP of the retrofitted refrigerant composition is less than 600, or
when the retrofitted refrigerant composition is the second retrofitted refrigerant composition or the third retrofitted refrigerant composition, and the refrigerant composition including the $CF_3I$ and the R1234yf refrigerant or the R1234ze(E) refrigerant and the $CF_3I$, adding one or more compounds includes:
adding an amount of the R134a refrigerant to address capacity, the amount of the R134a being selected so that a GWP of the retrofitted refrigerant composition is less than 600, and
wherein the retrofitted refrigerant composition is non-flammable and has a capacity that is equal to or greater than 90% of a capacity of R134a refrigerant alone.

9. The method of claim 8, wherein
the retrofitted refrigerant composition is the first retrofitted refrigerant composition, and
the retrofitted refrigerant composition has a temperature glide that is equal to or less than 1.0°.

10. The method of claim 8, wherein the retrofitted refrigerant composition is the second retrofitted refrigerant composition, and the capacity of the retrofitted refrigerant composition being equal to or greater than the capacity of R134a refrigerant alone.

11. The method of claim 8, wherein a temperature glide of the retrofitted refrigerant composition is equal to or less than 1° C.

12. The method of claim 8, wherein the GWP of the retrofitted refrigerant composition is less than 150.

13. The method of claim 8, wherein the retrofitted refrigerant composition is the third retrofitted refrigerant composition.

14. The method of claim 6, wherein the first refrigerant is the R1234yf refrigerant, and the refrigerant composition includes: from about 2 wt % to about 68 wt % of the R1234yf refrigerant about 63.7 wt %, or greater than 0 wt % and less than 63.7 wt % of the $CF_3I$; and from about 9.8 wt % to about 46 wt % of the R134a refrigerant, and
the capacity of the refrigerant composition is equal to or greater than the capacity of R134 refrigerant alone.

15. The method of claim 6, wherein the first refrigerant is the R1234ze(E) refrigerant, and the refrigerant composition includes: about 54.8 wt %, or greater than 0 wt % and less than 54.8 wt % of the R1234ze(E) refrigerant from about 4.5 wt % to about 91 wt % of $CF_3I$; and from about 1.9 wt % to about 46 wt % of the R134a refrigerant.

16. The method of claim 6, wherein
the first refrigerant is the R152a refrigerant, and the refrigerant composition includes: from about 1 wt % to about 30 wt % of the R152a refrigerant from about 33.9 wt % to about 78.6 wt % of the $CF_3I$; and about 46 wt %, or less than 46 wt % and greater than 0 wt % of the R134a refrigerant, and
the refrigerant composition has a temperature glide that is equal to or less than 1.0° C.

17. The non-flammable refrigerant composition of claim 4, wherein
the non-flammable refrigerant composition comprises:
about 52.6 wt %, or greater than 0 wt % and less than 52.6 wt % of the R1234ze(E) refrigerant;
from about 25.2 wt % to about 76.2 wt % of the $CF_3I$; and
from about 1.9 wt % to about 46 wt % of the R134a refrigerant, and
the refrigerant composition has a temperature glide that is equal to or less than 1.0° C.

* * * * *